United States Patent
Gunda

(10) Patent No.: US 10,802,858 B2
(45) Date of Patent: *Oct. 13, 2020

(54) COLLECTING AND PROCESSING CONTEXTUAL ATTRIBUTES ON A HOST

(71) Applicant: Nicira, Inc., Palo Alto, CA (US)

(72) Inventor: Laxmikant Vithal Gunda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/650,294

(22) Filed: Jul. 14, 2017

(65) Prior Publication Data

US 2018/0183764 A1    Jun. 28, 2018

Related U.S. Application Data

(60) Provisional application No. 62/438,379, filed on Dec. 22, 2016.

(51) Int. Cl.
    *G06F 9/455*     (2018.01)
    *H04L 29/06*     (2006.01)
    (Continued)

(52) U.S. Cl.
    CPC ............ *G06F 9/45558* (2013.01); *G06F 9/06* (2013.01); *G06F 21/50* (2013.01); *G06F 21/55* (2013.01);
    (Continued)

(58) Field of Classification Search
    CPC ..... H04L 51/12; H04L 51/14; H04L 63/0236; H04L 63/0245; H04L 63/1425;
    (Continued)

(56) References Cited

U.S. PATENT DOCUMENTS 5,826,051 A    10/1998   Porter et al.
5,950,195 A     9/1999   Stockwell et al.
(Continued)

FOREIGN PATENT DOCUMENTS

EP      2748750 A1    7/2014
EP      3542266 A1    9/2019
(Continued)

OTHER PUBLICATIONS

Deri et al. "nDPI: Open-Source High-Speed Deep Packet Inspection". 2014 International Wireless Communications and Mobile Computing Conference (IWCMC). IEEE. pp. 617-622. (Year: 2014).*
(Continued)

*Primary Examiner* — John M Macilwinen
(74) *Attorney, Agent, or Firm* — Adeli LLP

(57) ABSTRACT

Some embodiments of the invention provide a novel architecture for capturing contextual attributes on host computers that execute one or more machines, and for consuming the captured contextual attributes to perform services on the host computers. The machines are virtual machines (VMs) in some embodiments, containers in other embodiments, or a mix of VMs and containers in still other embodiments. Some embodiments execute a guest-introspection (GI) agent on each machine from which contextual attributes need to be captured. In addition to executing one or more machines, each host computer in these embodiments executes a context engine and one or more attribute-based service engines. Through the GI agents of the machines of a host's machine, the context engine of that host in some embodiments collects contextual attributes associated with network and/or process events on the machines, and provides the contextual attributes to the service engines to use to identify service rules for processing.

18 Claims, 22 Drawing Sheets

(51) Int. Cl.
*G06F 9/06* (2006.01)
*H04L 12/58* (2006.01)
*G06F 21/50* (2013.01)
*G06F 21/55* (2013.01)
*G06F 21/57* (2013.01)
*H04L 29/12* (2006.01)

(52) U.S. Cl.
CPC ............ *G06F 21/57* (2013.01); *G06F 21/577* (2013.01); *H04L 51/14* (2013.01); *H04L 63/0236* (2013.01); *H04L 63/0245* (2013.01); *H04L 63/0254* (2013.01); *H04L 63/0263* (2013.01); *H04L 63/0281* (2013.01); *H04L 63/0471* (2013.01); *H04L 63/1425* (2013.01); *H04L 63/1441* (2013.01); *H04L 63/1466* (2013.01); *H04L 63/20* (2013.01); *G06F 2009/45595* (2013.01); *G06F 2221/2105* (2013.01); *H04L 51/12* (2013.01); *H04L 61/103* (2013.01); *H04L 61/2015* (2013.01); *H04L 61/2521* (2013.01); *H04L 61/2596* (2013.01); *H04L 61/6013* (2013.01); *H04L 61/6022* (2013.01); *H04L 63/1433* (2013.01)

(58) Field of Classification Search
CPC . H04L 63/1466; H04L 63/20; G06F 9/45558; G06F 21/57; G06F 21/577
See application file for complete search history.

(56) References Cited

U.S. PATENT DOCUMENTS

| | | |
|---|---|---|
| 6,363,477 B1 | 3/2002 | Fletcher et al. |
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,095,662 B1 | 1/2012 | Lappas et al. |
| 8,190,767 B1 | 5/2012 | Maufer et al. |
| 8,365,294 B2 | 1/2013 | Ross |
| 8,381,209 B2 | 2/2013 | Reumann et al. |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 8,966,035 B2 | 2/2015 | Casado et al. |
| 9,009,836 B1 | 4/2015 | Yarykin et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,948,611 B2 | 4/2018 | Kumar et al. |
| 9,996,697 B2 | 6/2018 | Mahaffey et al. |
| 9,998,955 B1 | 6/2018 | MacCarthaigh |
| 10,033,693 B2 | 7/2018 | Sengupta et al. |
| 10,228,959 B1 | 3/2019 | Anderson et al. |
| 10,324,746 B2 | 6/2019 | Kumar et al. |
| 10,333,983 B2 | 6/2019 | Vaidya et al. |
| 10,503,536 B2 | 12/2019 | Gunda |
| 10,581,960 B2 | 3/2020 | Gunda et al. |
| 10,606,626 B2 | 3/2020 | Feroz et al. |
| 10,609,160 B2 | 3/2020 | Poon et al. |
| 2002/0116523 A1 | 8/2002 | Warrier et al. |
| 2002/0122422 A1 | 9/2002 | Kenney et al. |
| 2003/0005118 A1* | 1/2003 | Williams ................ H04L 63/08 709/225 |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0080898 A1 | 4/2005 | Block |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2007/0061492 A1 | 3/2007 | Riel |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0254990 A1 | 10/2009 | McGee et al. |
| 2009/0265414 A1 | 10/2009 | Bryan |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2010/0251363 A1 | 9/2010 | Todorovic |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0208960 A1 | 8/2011 | Flood |
| 2011/0225624 A1 | 9/2011 | Sawhney et al. |
| 2011/0238581 A1 | 9/2011 | Severson et al. |
| 2011/0246637 A1 | 10/2011 | Murakami |
| 2012/0207174 A1 | 8/2012 | Shieh |
| 2012/0222114 A1 | 8/2012 | Shanbhogue |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |

(56) References Cited

U.S. PATENT DOCUMENTS

| | | |
|---|---|---|
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0155043 A1 | 6/2014 | Gell et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0226820 A1 | 8/2014 | Chopra et al. |
| 2014/0230008 A1* | 8/2014 | Feroz ............ H04L 63/20 726/1 |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0012964 A1 | 1/2015 | Xie et al. |
| 2015/0067818 A1 | 3/2015 | Molander et al. |
| 2015/0082301 A1 | 3/2015 | Garg et al. |
| 2015/0096007 A1 | 4/2015 | Sengupta et al. |
| 2015/0106438 A1 | 4/2015 | Fan et al. |
| 2015/0121061 A1 | 4/2015 | Goyal et al. |
| 2015/0134822 A1 | 5/2015 | Bhagwat et al. |
| 2015/0154293 A1 | 6/2015 | Lu |
| 2015/0163117 A1 | 6/2015 | Lambeth et al. |
| 2015/0169345 A1 | 6/2015 | DeCusatis et al. |
| 2015/0172208 A1 | 6/2015 | DeCusatis et al. |
| 2015/0269383 A1 | 9/2015 | Lang et al. |
| 2015/0350807 A1 | 12/2015 | Andrews et al. |
| 2015/0358231 A1 | 12/2015 | Zhang et al. |
| 2015/0358344 A1 | 12/2015 | Mumcuoglu et al. |
| 2015/0379279 A1 | 12/2015 | Feroz et al. |
| 2015/0381578 A1 | 12/2015 | Thota et al. |
| 2016/0057167 A1 | 2/2016 | Bach |
| 2016/0072669 A1 | 3/2016 | Saavedra |
| 2016/0087905 A1 | 3/2016 | Liu et al. |
| 2016/0119194 A1 | 4/2016 | Lopez et al. |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0224789 A1 | 8/2016 | Feroz et al. |
| 2016/0232024 A1 | 8/2016 | Hamilton et al. |
| 2016/0234250 A1 | 8/2016 | Ashley et al. |
| 2016/0241389 A1 | 8/2016 | Saint et al. |
| 2016/0294923 A1 | 10/2016 | Fan et al. |
| 2016/0330138 A1 | 11/2016 | Thomason |
| 2016/0359658 A1 | 12/2016 | Yadav et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1 | 4/2017 | Raney |
| 2017/0126677 A1 | 5/2017 | Kumar et al. |
| 2017/0170990 A1 | 6/2017 | Gaddehosur et al. |
| 2017/0171143 A1 | 6/2017 | Ge et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063160 A1 | 3/2018 | Kumar |
| 2018/0063194 A1 | 3/2018 | Vaidya et al. |
| 2018/0103011 A1* | 4/2018 | Li ............ H04W 24/00 |
| 2018/0159733 A1 | 6/2018 | Poon et al. |
| 2018/0159943 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |
| 2018/0183759 A1 | 6/2018 | Gunda et al. |
| 2018/0183761 A1 | 6/2018 | Gunda et al. |
| 2018/0183866 A1 | 6/2018 | Gunda et al. |
| 2018/0191763 A1 | 7/2018 | Hillard et al. |
| 2018/0212818 A1 | 7/2018 | Ide et al. |
| 2018/0241761 A1 | 8/2018 | Bania et al. |
| 2018/0351912 A1 | 12/2018 | Sengupta et al. |
| 2019/0034454 A1 | 1/2019 | Gangumalla et al. |
| 2019/0036956 A1 | 1/2019 | Gunda et al. |
| 2019/0149525 A1 | 5/2019 | Gunda et al. |
| 2019/0235934 A1 | 8/2019 | Chanda et al. |
| 2019/0238429 A1 | 8/2019 | Chanda et al. |
| 2019/0266004 A1 | 8/2019 | Kumar et al. |
| 2019/0394302 A1 | 12/2019 | Kristiansson et al. |
| 2020/0036608 A1 | 1/2020 | Chanda et al. |

FOREIGN PATENT DOCUMENTS

| | | |
|---|---|---|
| WO | 2008095010 A1 | 8/2008 |
| WO | 2013074828 A1 | 5/2013 |
| WO | 2014126574 A1 | 8/2014 |
| WO | 2018044352 A1 | 3/2018 |
| WO | 2018106612 A1 | 6/2018 |
| WO | 2018118465 A1 | 6/2018 |

OTHER PUBLICATIONS

Brownlee et al. RFC 2722. "Traffic Flow Measurement: Architecture". pp. 1-48. (Year: 1999).*
Flegkas, Paris, et al., "On Policy-Based Extensible Hierarchical Network Management in QoS-Enabled IP Networks," POLICY '01 Proceedings of the International Workshop on Policies for Distributed Systems and Networks, Jan. 29-31, 2011,17 pages, Spring-Verlag, London, UK.
Non-Published commonly Owned U.S. Appl. No. 15/650,251, filed Jul. 14, 2017, 91 pages, Nicira, Inc.
Non-Published commonly Owned U.S. Appl. No. 15/896,099, filed Feb. 14, 2018, 58 pages, Nicira, Inc.
Non-Published commonly Owned U.S. Appl. No. 15/650,340, filed Jul. 14, 2017, 90 pages, Nicira, Inc.
Non-Published commonly Owned U.S. Appl. No. 15/795,875, filed Oct. 30, 2017, 88 pages, Nicira, Inc.
Non-Published commonly Owned U.S. Appl. No. 15/830,074, filed Dec. 4, 2017, 40 pages, Nicira, Inc.
Non-Published commonly Owned U.S. Appl. No. 15/830,086, filed Dec. 4, 2017, 40 pages, Nicira, Inc.
Non-Published commonly Owned U.S. Appl. No. 15/836,888, filed Dec. 10, 2017, 59 pages, Nicira, Inc.
Non-Published commonly Owned U.S. Appl. No. 15/836,892, filed Dec. 10, 2017, 48 pages, Nicira, Inc.
Non-Published commonly Owned U.S. Appl. No. 15/847,898, filed Dec. 19, 2017, 50 pages, Nicira, Inc.
Non-Published commonly Owned U.S. Appl. No. 15/847,908, filed Dec. 19, 2017, 58 pages, Nicira, Inc.
Non-Published commonly Owned U.S. Appl. No. 15/881,639, filed Jan. 26, 2018, 34 pages, Nicira, Inc.
Non-Published commonly Owned U.S. Appl. No. 15/881,645, filed Jan. 26, 2018, 34 pages, Nicira, Inc.
Non-Published Commonly Owned International Patent Application PCT/US17/65495, filed Dec. 10, 2017, 86 pages, Nicira, Inc.
Author Unknown, "CISCO Identity-Based Firewall Security," Month Unknown 2011, 2 pages, CISCO Systems, Inc.
Author Unknown, "Enabling Service Chaining on Cisco Nexus 1000V Series," Month Unknown, 2012, 25 pages, CISCO.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Dumitriu, Dan Mihai, et al., (U.S. Appl. No. 61/514,990), filed Aug. 4, 2011.

(56) References Cited

OTHER PUBLICATIONS

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Nance, Kara, et al., "Virtual Machine Introspection: Observation or Interference?," IEEE Security and Privacy, Sep. 1, 2008, 6 pages, vol. 6, No. 5, IEEE Service Center, Los Alamitos, CA, US.

PCT International Search Report and Written Opinion dated Mar. 14, 2018 for commonly owned International Patent Application PCT/US17/065495, 12 pages, Nicira, Inc.

Non-Published Commonly Owned U.S. Appl. No. 16/833,532, filed Mar. 28, 2020, 48 pages, Nicira, Inc.

* cited by examiner

| SRC IP | SRC Port | DEST IP | DEST Port | Prot. | Context Attribute | Action |
|---|---|---|---|---|---|---|
| * | * | * | * | * | App: Skype, Version: 1024 | Block |
| * | * | * | * | * | Group: Nurses, AppID: YouTube | Block |
| * | * | IP Add A | * | * | Threat: High | Block |
| * | * | VIP A | * | * | Group: Doctors or Nurses | Allow |
| * | * | VIP A | * | * | Group: Accountants | Block |
| * | * | VIP B | * | * | Group: High Security | Allow |
| * | * | VIP B | * | * | Group: AdminProcess | Block |

*Figure 8*

COLLECTING AND PROCESSING CONTEXTUAL ATTRIBUTES ON A HOST

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts. Most of these middlebox solutions, however, do not take advantage of the rich-contextual data that can be captured for each data message flow on the host. One reason for this is that existing techniques do not provide an efficient, distributed scheme for filtering the thousands of captured-contextual attributes in order to efficiently process service rules that are defined in terms of much smaller sets of contextual attributes.

BRIEF SUMMARY

Some embodiments of the invention provide a novel architecture for capturing contextual attributes on host computers that execute one or more machines, and for consuming the captured contextual attributes to perform services on the host computers. The machines are virtual machines (VMs) in some embodiments, containers in other embodiments, or a mix of VMs and containers in still other embodiments.

Some embodiments execute a guest-introspection (GI) agent on each machine from which contextual attributes need to be captured. In addition to executing one or more machines on each host computer, these embodiments also execute a context engine and one or more attribute-based service engines on each host computer. Through the GI agents of the machines on a host, the context engine of that host in some embodiments collects contextual attributes associated with network events and/or process events on the machines. As further described below, the context engine then provides the contextual attributes to the service engines, which, in turn, use these contextual attributes to identify service rules that specify context-based services to perform on processes executing on the machines and/or data message flows sent by or received for the machines.

In some embodiments, the context engine of a host collects contextual attributes from the GI agents of the machines on that host through a variety of different ways. For instance, in some embodiments, the GI agent on a machine registers hooks (e.g., callbacks) with one or more modules (e.g., kernel-space modules or user-space modules) in the machine's operating system for all new network connection events and all new process events.

Upon occurrence of a new network connection event, the GI agent receives a callback from the OS and based on this callback, provides a network event identifier to the context engine. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, the context engine directs the GI agent to collect from the OS modules additional process parameters that are associated with the process identifier (ID) that it received with the network event. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of using the process identifier to query the GI agent for additional process parameters associated with a network event, the context engine in other embodiments receives all the process parameters associated with a network event in one shot when the GI agent reports the network event to the context engine.

The OS on a machine in some embodiments holds up a new network event (i.e., does not start sending data messages for the network event) until the GI agent on the machine directs it to proceed with processing the network event. In some of these embodiments, the GI agent only allows the OS to proceed with processing the network event after the context engine has collected all the needed attributes for this event (e.g., after receiving a message from the context engine that specifies that it has received all the process or network attributes that it needs for the new network event).

In some embodiments, the context engine uses the process hash that it receives from the GI agent to identify the name and version of the application (i.e., the software product) to which the process belongs. To do this, the context engine in some embodiments stores process hashes and associated application names/versions, compares the process hash that it receives from the GI agent with the stored process hashes to identify a matching hash, and then uses the application name/version of the matching hash as the application name and version of the process associated with the event.

In some embodiments, the context engine obtains the process hashes and application names/versions from one or more network or compute managers, which may operate on another device or computer. In other embodiments, the context engine provides the hash associated with a process identifier to a network or compute manager, which then matches this hash to its process hash records and provides the application name/version of the associated process to the context engine. Once the context engine obtains the application name/version associated with a network event, it can provide the name and version attributes to the attribute-based service engines, which can use this information (i.e., the application name and/or version) to identify the service rule to enforce.

Upon occurrence of a process event, the GI agent receives a callback from the OS and based on this callback, provides a process event identifier to the context engine. The process event identifier provides a set of attributes pertaining to the process event. This set of attributes includes the process identifier in some embodiments. In some embodiments, this set also includes a user identifier and/or a group identifier (e.g., an activity directory (AD) identifier).

In some embodiments, the GI agent provides all the process parameters (e.g., process identifier, user ID, group ID, process name, process hash, loaded module identifiers, consumption parameters, etc.) associated with a process event to the context engine when it reports the process event to the context engine. In other embodiments, the context engine directs the GI agent to collect from the OS modules additional process parameters that are associated with the process identifier that context engine received with the process event. These additional process parameters in some embodiments are the same (e.g., process name, process hash, loaded module identifiers, consumption parameters, etc.) as the process parameters mentioned above for reported network events.

The context engine of some embodiments augments the contextual attributes that it receives from the GI agent with contextual attributes that it receives from other modules that execute on the host. For instance, in some embodiments, a deep packet inspection (DPI) module executes on the host. The context engine or another module (e.g., a firewall engine) directs this DPI engine to examine data messages of a data message flow associated with a process ID to identify the type of traffic being sent in these data messages by the application associated with the process ID.

The identified traffic-type identity is today commonly referred to as the AppID. Also, currently there are a number of DPI modules that analyze messages of a data message flow to generate the AppID. In some embodiments, the context engine combines the AppID that it obtains for a network event with other context attributes that it identifies for this event (e.g., by using the event's five-tuple identifier to associate the AppID with the collected contextual attributes), in order to produce a very rich set of attributes that the service engines can then use to perform their services. This rich set of attributes provides true application identity (i.e., the application name, application version, application traffic type, etc.), based on which the service engines can perform their services.

Also, in some embodiments, a threat detection module executes on the host computer along with the context engine. Once the context engine obtains a set of process parameters that specify that a process has started on a machine or is sending data messages on the machine, the context engine in some embodiments provides one or more process parameters (e.g., process hash, application name, application version, AppID, other process parameters, etc.) to the threat detection module. This threat detection module then generates a threat level indicator (e.g., low, medium, high, etc.) for the identified process and provides this threat level indicator to the context engine. The context engine then provides this threat level indicator to one or more service engines as another contextual attribute for performing services on a new process event or the data messages of a new network event; a service engine can use the threat level indicator as another attribute to identify service rules to enforce.

The context engine employs a push model in some embodiments to distribute the collected contextual attributes to the service engines, while it employs a pull model in other embodiments to distribute these attributes to the service engines. In still other embodiments, the content engine employs a push model for some service engines and a pull model for other service engines. In the push model, the context engine distributes to a service engine the contextual attributes that it collects for a process event or a network event with the process's identifier and/or the network event's flow identifier (e.g., the flow's five-tuple identifier). In some embodiments, the context engine distributes to the service engine only the contextual attributes that are relevant for that service engine's service rules.

In the pull model, the context engine receives queries from a service engine for the contextual attributes that the context engine has collected for a particular process or network connection. In some embodiments, the context engine receives a process ID or a flow identifier (e.g., five-tuple identifier) with a query from the service engine, and uses the received identifier to identify the attribute set that it has to provide to the service engine. In some embodiments, the context engine generates a service token (also called a service tag) for the collection of attributes that are relevant for the service engine, and provides this service token to another module (e.g., the GI agent or another module on the host) to pass along to the service engine (e.g., pass along in a data message's encapsulating header). The service engine then extracts the service token and provides this service token to the context engine in order to identify the contextual attributes that the context engine has to provide to the service engine.

The context engine in some embodiments provides contextual-attributes to several context-based service engines on its host computer. In some embodiments, the context engine and the service engines are all kernel space components of a hypervisor on which multiple VMs or containers execute. In other embodiments, the context engine and/or one or more service engines are user space processes. For example, one or more service engines in some embodiments are service VMs (SVMs).

Different embodiments use different types of context-based service engines. For instance, in some embodiments, the attribute-based service engines include (1) a firewall engine that performs context-based firewall operations on data messages sent by or received for the machines, (2) a process control engine that enforces context-based process control operations (e.g., process assessment and termination operations) on processes started on the machines, (3) a load-balancing engine that performs context-based load-balancing operations to distribute the data message flows from the machines to different destination or service nodes in one or more destination/service node clusters, and (4) an encryption engine that performs context-based encryption or decryption operations to encrypt data message from the machines, or to decrypt data messages received for the machines.

Another context-based service engine in some embodiments is a discovery service engine. In some embodiments, the discovery engine captures new process events and new network events from the context engine, along with the contextual attributes that the context engine collects for these process and network events. The discovery service engine then relays these events and their associated contextual attributes to one or more network managers (e.g., servers) that provide a management layer that allows network administrators to visualize events in a datacenter and specify policies for compute and network resources in the datacenter.

In relaying these events and attributes to the network management layer, the discovery module of some embodiments performs some pre-processing of these events and attributes. For example, in some embodiments, the discovery module filters some of the network or process events, while aggregating some or all of these events and their attributes. Also, in some embodiments, the discovery engine directs the context engine to collect additional contextual attributes for process or network events through the GI agents or other modules (e.g., the DPI engine or threat detection engine), or to capture other types of events, such as file events and system events.

For example, in some embodiments, the discovery engine directs the context engine to build an inventory of the applications installed on the machines, and to periodically refresh this inventory. The discovery engine might so direct the context engine at the request of the management plane, or based on operational configurations that the management or control plane specifies for the discovery engine. In response to the request from the discovery engine, the context engine in some embodiments has each GI agent on each of its host's machine discover all installed processes on the machine, and all running processes and services.

After building an inventory of installed applications and the running processes/services, the discovery engine of a host computer in a datacenter provides this information to the network/compute managers in the management plane. In some embodiments, the management plane collects contextual attributes from sources other than the host computer discovery and context engines. For instance, in some embodiments, the management plane collects from one or more servers compute context (e.g., cloud context from cloud vendors, or compute virtualization context by datacenter virtualization software), identity context from directory service servers, mobility context from mobility management servers, endpoint context from DNS (domain name server) and application inventory servers, network context (e.g., virtual network context) from network virtualization server, etc.

By collecting the contextual information (e.g., information from the discovery and context engines and/or information from other context sources), the management plane can provide a user interface to the network/compute administrators to visualize the compute and network resources in the datacenter. Moreover, the collected contextual attributes allow the management plane to provide controls through this user interface for these administrators to specify context-based service rules and/or policies. These service rules/policies are then distributed to the host computers so that service engines on these computers can perform context-based service operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 8 illustrates several more detailed examples of the context-based firewall rules of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel architecture for capturing contextual attributes on host computers that execute one or more machines, and for consuming the captured contextual attributes to perform services on the host computers. Some embodiments execute a guest-introspection (GI) agent on each machine from which contextual attributes need to be captured. In addition to executing one or more machines on each host computer, these embodiments also execute a context engine and one or more attribute-based service engines on each host computer. Through the GI agents of the machines on a host, the context engine of that host in some embodiments collects contextual attributes associated with network events and/or process events on the machines. The context engine then provides the contextual attributes to the service engines, which, in turn, use these contextual attributes to identify service rules that specify context-based services to perform on processes executing on the machines and/or data message flows sent by or received for the machines.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
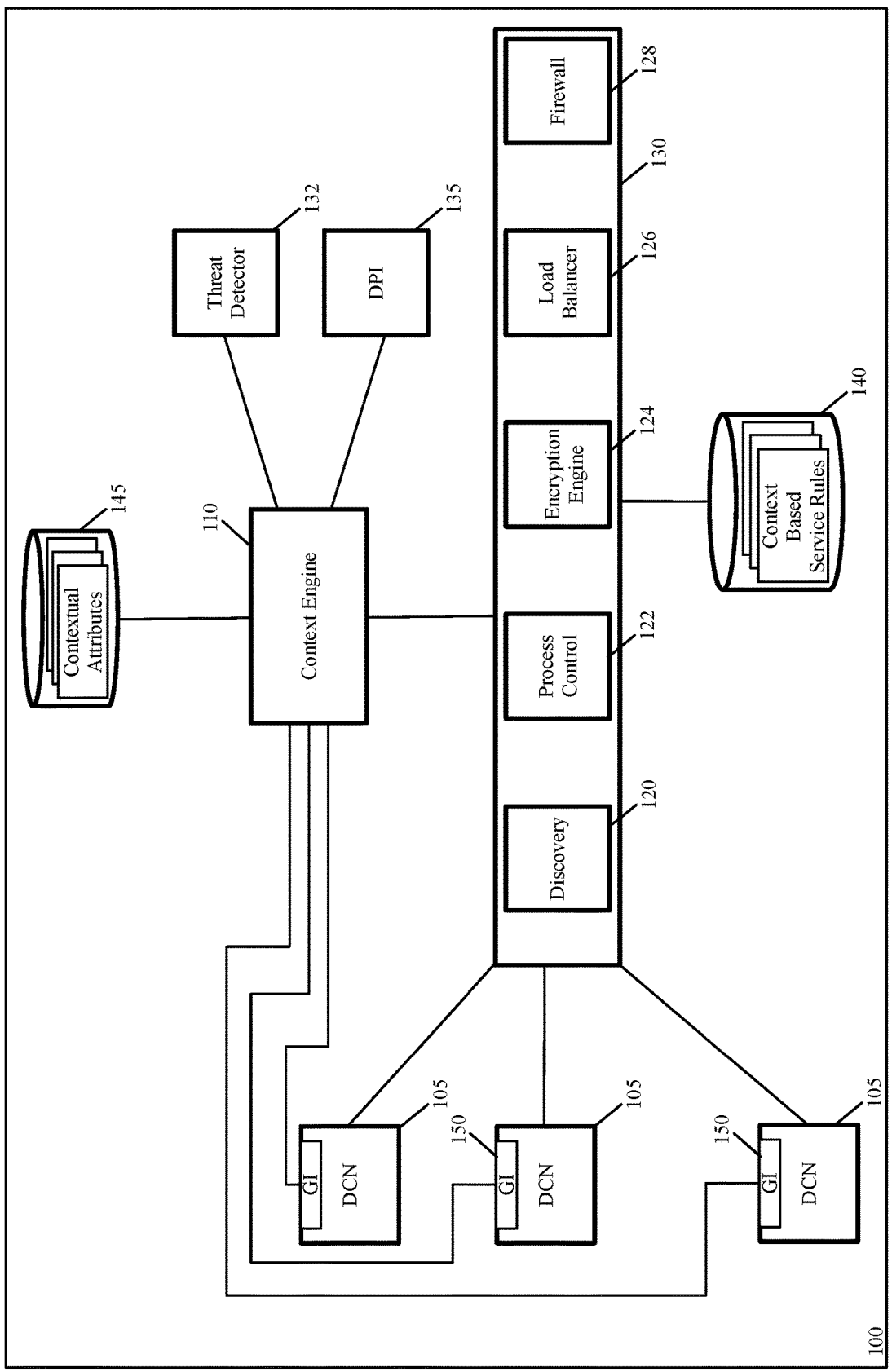
FIG. 1 illustrates a host computer that uses the context engine and context-based service engines of some embodiments of the invention.

FIG. 1 illustrates a host computer 100 that uses the context engine and context-based service engines of some embodiments of the invention. As shown, the host computer 100 includes several data compute nodes 105, a context engine 110, several context-based service engines 130, a threat detector 132, and a deep packet inspection (DPI) module 135. The context-based service engines include a discovery engine 120, a process control engine 122, an encryption engine 124, a load balancer 126 and a firewall engine 128. It also includes context-based service rule storages 140, and an attribute storage 145.

The DCNs are endpoint machines executing on the host computer 100. The DCNs are virtual machines (VMs) in some embodiments, containers in other embodiments, or a mix of VMs and containers in still other embodiments. On each DCN, a GI agent 150 executes in order to collect contextual attributes for the context engine 110. In some embodiments, the context engine 110 collects contextual attributes from the GI agents 150 of the DCNs on its host through a variety of different ways. For instance, in some embodiments, the GI agent on a DCN registers hooks (e.g., callbacks) with one or more modules (e.g., kernel-space modules or user-space modules) in the DCN's operating system for all new network connection events and all new process events.

Upon occurrence of a new network connection event, the GI agent 150 receives a callback from its DCN's OS and based on this callback, provides a network event identifier to the context engine 110. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, the context engine directs the GI agent 150 to collect from the OS modules additional process parameters that are associated with the process identifier (ID) that it received with the network event. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of using the process identifier to query the GI agent 150 for additional process parameters associated with a network event, the context engine 110 in other embodiments receives all the process parameters associated with a network event in one shot when the GI agent reports the network event to the context engine.

The OS of the DCN in some embodiments holds up a new network event (i.e., does not start sending data messages for the network event) until the GI agent 150 on that DCN directs it to proceed with processing the network event. In some of these embodiments, the GI agent 150 only allows the OS to proceed with processing the network event after the context engine 110 has collected all the needed attributes for this event (e.g., after receiving a message from the context engine that specifies that it has received all the process or network attributes that it needs for the new network event).

In some embodiments, the context engine 110 uses the process hash that it receives from the GI agent 150 to identify the name and version of the application (i.e., the software product) to which the process belongs. To do this, the context engine 110 in some embodiments stores process hashes and associated application names/versions, compares the process hash that it receives from the GI agent with the stored process hashes to identify a matching hash, and then uses the application name/version of the matching hash as the application name and version of the process associated with the event.

In some embodiments, the context engine 110 obtains the process hashes and application names/versions from one or more network or compute managers, which may operate on another device or computer. In other embodiments, the context engine provides the hash associated with a process identifier to a network or compute manager, which then matches this hash to its process hash records and provides the application name/version of the associated process to the context engine. Once the context engine 110 obtains the application name/version associated with a network event, it can provide the name and version attributes to the attribute-based service engines, which can use this information (i.e., the application name and/or version) to identify the service rule to enforce.

Upon occurrence of a process event on a DCN 105, the DCN's GI agent 150 in some embodiments receives a callback from the DCN's OS and based on this callback, provides a process event identifier to the context engine 110. The process event identifier provides a set of attributes pertaining to the process event. This set of attributes includes the process identifier in some embodiments. In some embodiments, this set also includes a user identifier and/or a group identifier (e.g., an activity directory (AD) identifier).

In some embodiments, the GI agent provides all the process parameters (e.g., process identifier, user ID, group ID, process name, process hash, loaded module identifiers, consumption parameters, etc.) associated with a process event to the context engine when it reports the process event to the context engine. In other embodiments, the context engine directs the GI agent to collect from the OS modules additional process parameters that are associated with the process identifier that context engine received with the process event. These additional process parameters in some embodiments are the same (e.g., process name, process hash, loaded module identifiers, consumption parameters, etc.) as the process parameters mentioned above for reported network events.

The context engine 110 of some embodiments augments the contextual attributes that it receives from the GI agents 150 with contextual attributes that it receives from other modules that execute on the host. The DPI module 135 (also referred to as the deep packet inspector) and the threat detector 132 (also referred to as the threat inspection module) are two such modules that provide contextual attributes to augment those that the context engine collects from the GI agents 150. In some embodiments, a DPI module is directed by the context engine 110 or another module (e.g., a firewall engine 128) to examine data messages of a data message flow associated with a process ID to identify the type of traffic being sent in these data messages by the application associated with the process ID.

The identified traffic-type identity is today commonly referred to as the AppID. Also, currently there are a number of DPI modules that analyze messages of a data message flow to generate the AppID for the data message flow. In some embodiments, the context engine combines the AppID that it obtains for a network event with other context attributes that it identifies for this event, in order to produce a very rich set of attributes that the service engines can then use to perform their services. This rich set of attributes provides true application identity (i.e., the application name, application version, application traffic type, etc.), based on which the service engines can perform their services. In some embodiments, the context engine 110 uses a network event's five-tuple identifier to associate the AppID for this event's data message flow with the contextual attributes that the context engine collects from the GI agent of the DCN associated with the data message flow (e.g., of the DCN from which the data message flow emanates).

The threat detector 132 provides a threat level indicator that specifies the threat level associated with a particular application that is executing on a DCN. Once the context engine obtains a set of process parameters that specify that a process has started on a machine or is sending data messages on the machine, the context engine in some embodiments provides one or more process parameters (e.g., process hash, application name, application version, AppID, other process parameters, etc.) to the threat detection module.

This threat detection module then generates a threat level indicator (e.g., low, medium, high, etc.) for the identified process and provides this threat level indicator to the context engine. In some embodiments, the threat detector assigns a threat score to an application running on a DCN based on various application behavioral factors, such as (1) whether it does poor input validation, (2) whether it passes authentication credentials over unencrypted network links, (3) whether it uses weak password and account policies, (4) whether it stores configuration secrets in clear text, (5) whether it can transfer files, (6) whether the application is known to propagate malware, (7) whether the application is purposely evasive, (8) whether the application has known vulnerabilities, etc. In some embodiments, the threat detector is a third-party whitelisting application, such as the Bit9.

The context engine in some embodiments provides the threat level indicator produced by the threat detector 132 to one or more service engines as another contextual attribute for performing services on a new process event or the data messages of a new network event; a service engine can use the threat level indicator as another attribute to identify service rules to enforce.

The context engine 110 stores the contextual attributes that it collects for network events and process events in the attribute storage 145. In some embodiments, the context engine stores each set of contextual attributes with one or more network event identifiers and/or process identifiers. For example, in some embodiments, the context engine 110 stores the collected contextual attributes for a new process event with the process identifier, or with a reference to this identifier. The context engine then uses the process identifier to provide the collected context attributes to a service engine (e.g., the process control engine 122) that performs a service for the process event.

The context engine in some embodiments stores the collected context attributes for a new network connection event with the five-tuple identifier of the network connection event, or with a reference to this five-tuple identifier. In some of these embodiments, the context engine provides to a service engine the context attributes for a network event along with this event's five-tuple identifier. The data messages for this network event will use this five-tuple identifier, and hence the service engine can use the supplied five-tuple identifier to identify the context attributes associated with a data message flow.

The context engine employs a push model in some embodiments to distribute the collected contextual attributes to the service engines 130, while in other embodiments this engine employs a pull model to distribute these attributes to the service engines 130. In still other embodiments, the context engine employs a push model for some service engines and a pull model for other service engines. In the push model, the context engine in some embodiments distributes to a service engine the contextual attributes that it collects for a process event or a network event with the process's identifier and/or the network event's flow identifier (e.g., the flow's five-tuple identifier).

In some embodiments, the context engine distributes to the service engine only the contextual attributes that are relevant for that service engine's service rules. In other words, in these embodiments, the context engine compares each collected attribute in a set of collected attributes (e.g., for a network event or a process event) with a list of attributes used by a service engine's service rules, and discards each collected attribute that is not used by the service rules. The context engine then provides to the service engine only the subset of collected attributes (in the set of collected attributes) that is being used by the engine's service rules. In other embodiments, the service engines perform this filtering operation to discard the contextual attributes that are not needed.

In the pull model, the context engine receives queries from a service engine for the contextual attributes that the context engine has collected for a particular process or network connection. In some embodiments, the context engine receives a process ID or a flow identifier (e.g., five-tuple identifier) with a query from the service engine, and uses the received identifier to identify the attribute set that it has to provide to the service engine.

In some embodiments, the context engine generates a service token (also called a service tag) for the collection of attributes that are relevant for the service engine, and provides this service token to another module (e.g., the GI agent or another module on the host) to pass along to the service engine (e.g., pass along in a data message's encapsulating header). The service engine then extracts the service token and provides this service token to the context engine in order to identify the contextual attributes that the context engine has to provide to the service engine.

In some embodiments, the context engine 110 and the service engines 130 are all kernel space components of a hypervisor on which multiple VMs or containers execute, as further described below by reference to FIG. 2. In other embodiments, the context engine and/or one or more service engines are user space processes. For example, one or more service engines in some embodiments are service VMs (SVMs). In some embodiments, one or more service engines are in ingress datapaths and/or egress datapaths of DCNs, in order to receive access to data message flows to and from the DCNs to perform services on these data message flow. In other embodiments, one or more other modules on the host 100 intercept data messages from the ingress/egress datapaths and forward these messages to one or more service engines for these engines to perform services on the data messages. One such approach will be described below by reference to FIG. 2.

Different embodiments use different types of context-based service engines. In the example illustrated in FIG. 1, the service engines 130 include the discovery engine 120, the process control engine 122, the encryption engine 124, the load balancer 126 and the firewall engine 128. Each of these service engines 130 has an attribute-based, service-rule storage. FIG. 1 collectively represents all the context-based, service-rule storages of these service engines with the context-based service rule storage 140 in order to simplify the illustration that is presented in this figure.

In some embodiments, each service rule in the context-based service rule storage 140 has a rule identifier for matching to a process or flow identifier to identify the rule to enforce for a process or network event. In some embodiments, the context-based service rule storage 140 is defined in a hierarchical manner to ensure that a rule check will match a higher priority rule before matching a lower priority rule. Also, in some embodiments, the context-based service rule storage 140 contains a default rule that specifies a default action for any rule check, as further explained below.

The firewall engine 128 performs firewall operations on data messages sent by or received for the DCNs 105. These firewall operations are based on firewall rules in the context-based service rule storage 140. Some of the firewall rules are defined purely in terms of layer 2-layer 4 attributes, e.g., in terms of five-tuple identifiers. Other firewall rules are defined in terms of contextual attributes that can include one or more of the collected contextual attributes, such as application names, application versions, AppID, resource consumption, threat level, user ID, group ID, etc. Yet other firewall rules in some embodiments are defined in terms of both L2-L4 parameters and contextual attributes. As the firewall engine 128 can resolve firewall rules that are defined by reference to contextual attributes, this firewall engine is referred to as a context-based firewall engine.

In some embodiments, the context-based firewall engine 128 can allow, block or re-route data message flows based on any number of contextual attributes, because its firewall rules can be identified in terms of any combination of the collected contextual attributes. For example, this firewall engine can block all email traffic from chrome.exe when the user is part of a Nurse user group, when one firewall rule specifies that data messages should be blocked when the flow is associated with the Nurse group ID, the AppID identifies the traffic type as email, and the application name is Chrome. Similarly, context based firewall rules can block data message flows associated with video conferences, online video viewing, or use of old versions of software. Examples of such rules would block all Skype traffic, block all YouTube™ video traffic, block all HipChat audio/video conferences when application version number is older than a particular version number, block data message flows for any application with a high threat score, etc.

The load-balancing engine 126 performs load-balancing operations on data messages sent by the DCNs 105 to distribute the data message flows to different destination or service nodes in one or more destination/service node clusters. These load-balancing operations are based on load-balancing rules in the context-based service rule storage 140.

In some of these embodiments, each load-balancing rule can specify one or more load-balancing criteria (e.g. a round robin criterion, a weighted round-robin criteria, etc.) for distributing traffic, and each criteria can be limited to a particular time range. In some embodiments, a load-balancing operation involves replacing a data message flow's destination network address (e.g., the destination IP address, the destination MAC address, etc.) with another destination network address.

Some of the load-balancing rules are defined purely in terms of L2-L4 attributes, e.g., in terms of five-tuple identifiers. Other load-balancing rules are defined in terms of contextual attributes that can include one or more of the collected contextual attributes, such as application names, application versions, AppID, resource consumption, threat level, user ID, group ID, etc. Yet other load-balancing rules in some embodiments are defined in terms of both L2-L4 parameters and contextual attributes. As the load-balancing engine 126 can resolve load-balancing rules that are defined by reference to contextual attributes, this load-balancing engine is referred to as a context-based load balancer.

In some embodiments, the context-based load balancer 126 can distribute the data message flows based on any number of contextual attributes, because its load-balancing rules can be identified in terms of any combination of the collected contextual attributes. For example, the data distribution of the load balancer 126 can be based on any combination of user and application data. Examples of such load-balancing operations include: (1) distributing data message flows associated with the Finance department on all load-balancing pools, (2) redirecting all the Finance department's traffic to another pool when the primary pool for this department is down to make this department's traffic highly available, and (3) making all traffic associated with the Doctor's user group highly available. In some embodiments, the load-balancing rules can also be defined in terms of collected resource consumption, in order to distribute traffic to provide more or less resources to applications that consume a lot of resources on the DCNs.

The encryption engine 124 performs encryption/decryption operations (collectively referred to as encryption operations) on data messages sent by or received for the DCNs 105. These encryption operations are based on encryption rules in the context-based service rule storage 140. In some embodiments, each of these rules includes an encryption/decryption key identifier, which the encryption engine can use to retrieve an encryption/decryption key from a key manager on the host or operating outside of the host. Each encryption rule also specifies in some embodiments the type of encryption/decryption operation that the encryption module has to perform.

Each encryption rule also has a rule identifier. For some encryption rules, the rule identifiers are defined purely in terms of L2-L4 attributes, e.g., in terms of five-tuple identifiers. Other encryption rules are defined in terms of contextual attributes that can include one or more of the collected contextual attributes, such as application names, application versions, AppID, resource consumption, threat level, user ID, group ID, etc. Yet other encryption rules in some embodiments are defined in terms of both L2-L4 parameters and contextual attributes. As the encryption engine 124 can resolve encryption rules that are defined by reference to contextual attributes, this encryption engine is referred to as a context-based encryption engine.

In some embodiments, the context-based encryption module 124 can encrypt or decrypt the data message flows based on any number of contextual attributes because its encryption rules can be identified in terms of any combination of the collected contextual attributes. For example, the encryption/decryption operation of the encryption engine 124 can be based on any combination of user and application data. Examples of such encryption operations include: (1) encrypt all traffic from Outlook (started on any machine) to Exchange Server, (2) encrypt all communication between applications in a three tier Webserver, Application Server and Database Server, (3) encrypt all traffic originating from the Administrators Active Directory group, etc.

The process control engine 122 enforces context-based process control operations (e.g., process assessment and termination operations) on processes started on the DCNs 105. In some embodiments, whenever the context engine 110 receives a new process event from a GI agent 150 of a DCN, it provides the process parameters associated with this process event to the process control engine 122. This engine then uses the received set of process parameters to examine its context-based service rule storage 140 to identify a matching context-based, process-control rule.

The process control engine 122 can direct the context engine to direct the GI agent of the DCN to perform a process-control operation on a process. Examples of such process-control operations include (1) terminating a video conference application that has a particular version number, (2) terminating a browser that is displaying YouTube traffic, and (3) terminating applications that have a high threat level score.

The discovery engine 120 is another context-based service engine. In some embodiments, the discovery engine 120 captures new process events and new network events from the context engine, along with the contextual attributes that the context engine collects for these process and network events. As further described below, the discovery service engine then relays these events and their associated contextual attributes to one or more network managers (e.g., servers) that provide a management layer that allows network administrators to visualize events in a datacenter and specify policies for compute and network resources in the datacenter.

In relaying these events and attributes to the network management layer, the discovery module of some embodiments performs some pre-processing of these events and attributes. For example, in some embodiments, the discovery module filters some of the network or process events, while aggregating some or all of these events and their attributes. Also, in some embodiments, the discovery engine 120 directs the context engine 110 to collect additional contextual attributes for process or network events through the GI agents 150 or other modules (e.g., the DPI engine or threat detection engine), or to capture other types of events, such as file events and system events.

For example, in some embodiments, the discovery engine directs the context engine to build an inventory of the applications installed on the machines, and to periodically refresh this inventory. The discovery engine might so direct the context engine at the request of the management plane, or based on operational configurations that the management or control plane specifies for the discovery engine. In response to the request from the discovery engine, the context engine in some embodiments has each GI agent on each of its host's machine discover all installed processes on the machine, and all running processes and services.

After building an inventory of installed applications and the running processes/services, the discovery engine of a host computer in a datacenter provides this information to the network/compute managers in the management plane. In some embodiments, the management plane collects contextual attributes from sources other than the host computer discovery and context engines. For instance, in some embodiments, the management plane collects from one or more servers compute context (e.g., cloud context from cloud vendors, or compute virtualization context by datacenter virtualization software), identity context from directory service servers, mobility context from mobility management servers, endpoint context from DNS (domain name server) and application inventory servers, network context (e.g., virtual network context from network virtualization server), etc.

By collecting the contextual information (e.g., information from the discovery and context engines and/or information from other context sources), the management plane can provide a user interface to the network/compute administrators to visualize the compute and network resources in the datacenter. Moreover, the collected contextual attributes allow the management plane to provide controls through this user interface for these administrators to specify context-based service rules and/or policies. These service rules/policies are then distributed to the host computers so that service engines on these computers can perform context-based service operations.

In some embodiments described above, the same service engine 130 (e.g., the same firewall engine 128) performs the same type of service (e.g., a firewall service) based on service rules that can be defined in terms of message flow identifiers (e.g., five-tuple identifiers) or in terms of collected contextual attributes (e.g., AppID, threat level, user identifier, group identifier, application name/version, etc.) associated with the data message flows. In other embodiments, however, different service engines provide the same type of service based on the message flow identifiers (e.g., five-tuple identifiers) and based the collected contextual attributes of the data message flows. For instance, some embodiments use one flow-based firewall engine that performs firewall operations based on rules defined in terms of flow identifiers, and another context-based firewall engine that performs firewall operations based on rules defined in terms of context attributes (e.g., AppID, threat level, user identifier, group identifier, application name/version, etc.).

Figure 2:
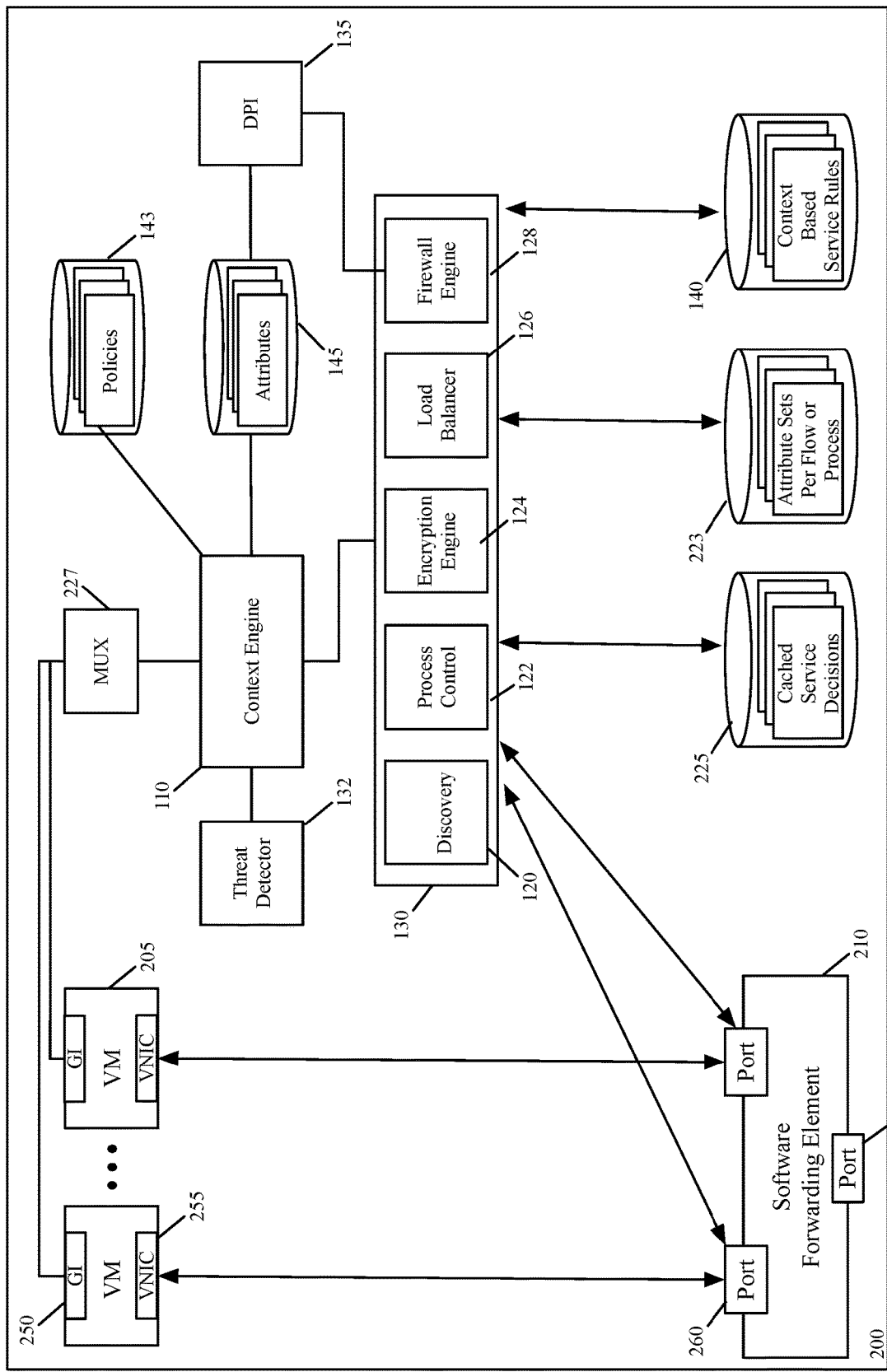
FIG. 2 illustrates a more-detailed example of a host computer that in some embodiments is used to establish a distributed architecture for configuring and performing context-rich, attribute-based services in a datacenter.

FIG. 2 illustrates a more-detailed example of a host computer 200 that in some embodiments is used to establish a distributed architecture for configuring and performing context-rich, attribute-based services in a datacenter. This host computer 200 includes many of the same components as host computer 100, such as context engine 110, service engines 130, threat detector 132, DPI module 135, context-based service rule storage 140, and context-attribute storage 145. Like in FIG. 1, the service engines 130 in FIG. 2 include the discovery engine 120, the process control engine 122, the encryption engine 124, the load balancer 126 and the firewall engine 128.

In FIG. 2, the DCNs are VMs 205 that execute on a hypervisor. Also, in FIG. 2, the host computer 200 includes a software forwarding element 210, an attribute-mapping storage 223, a connection state cache storage 225, a MUX (multiplexer) 227, and a context-engine policy storage 143. In some embodiments, the context engine 110, the software forwarding element 210, the service engines 130, the context-based service rule storages 140, the connection state cache storage 225, the context-engine policy storage 143, and the MUX 227 operate in the kernel space of the hypervisor, while the VMs 205 operate in the hypervisor's user space. In other embodiments, one or more service engines are user space modules (e.g., are service VMs).

In some embodiments, the VMs 205 serve as data end points in the datacenter. Examples of such machines include webservers, application servers, database servers, etc. In some cases, all the VMs belong to one entity, e.g., an enterprise that operates the host. In other cases, the host 200 operates in a multi-tenant environment (e.g., in a multi-tenant data center), and different VMs 205 may belong to one tenant or to multiple tenants.

Each VM 205 includes a GI agent 250 that interacts with the context engine 110 to provide context attribute sets to this engine, and to receive instructions and queries from this engine. The interactions between the GI agents 250 and the context engine 110 are similar to the interactions described above between the GI agents 150 and the context engine 110. However, as shown in FIG. 2, all the communication between the context engine 110 and the GI agents 250 in some embodiments are relayed through the MUX 227. One example of such a mux is the mux that is used by the Endpoint Security (EPSec) platform of ESX hypervisors of VMware, Inc.

In some embodiments, the GI agents communicate with the MUX 227 through a fast communication channel (such as VMCI channel of ESX). In some embodiments, this communication channel is a shared memory channel. As mentioned above, the attributes collected by the context engine 110 from the GI agents 250 in some embodiments include a rich group of parameters (e.g., layer 7 parameters, process identifiers, user identifiers, group identifiers, process name, process hash, loaded module identifiers, consumption parameters, etc.)

As shown, each VM 205 also includes a virtual network interface card (VNIC) 255 in some embodiments. Each VNIC is responsible for exchanging messages between its VM and the software forwarding element (SFE) 210. Each VNIC connects to a particular port 260 of the SFE 210. The SFE 210 also connects to a physical network interface card (NIC) (not shown) of the host. In some embodiments, the VNICs are software abstractions created by the hypervisor of one or more physical NICs (PNICs) of the host.

In some embodiments, the SFE 210 maintains a single port 260 for each VNIC of each VM. The SFE 210 connects to the host PNIC (through a NIC driver (not shown)) to send outgoing messages and to receive incoming messages. In some embodiments, the SFE 210 is defined to include a port 265 that connects to the PNIC's driver to send and receive messages to and from the PNIC. The SFE 210 performs message-processing operations to forward messages that it receives on one of its ports to another one of its ports. For example, in some embodiments, the SFE tries to use data in the message (e.g., data in the message header) to match a message to flow based rules, and upon finding a match, to perform the action specified by the matching rule (e.g., to hand the message to one of its ports 260 or 265, which directs the message to be supplied to a destination VM or to the PNIC).

In some embodiments, the SFE 210 is a software switch, while in other embodiments it is a software router or a combined software switch/router. The SFE 210 in some embodiments implements one or more logical forwarding elements (e.g., logical switches or logical routers) with SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (Aug. 5, 2013), VXLAN: A Framework for Overlaying Virtualized Layer 2 Networks over Layer 3 Networks, IETF.

The ports of the SFE 210 in some embodiments include one or more function calls to one or more modules that implement special input/output (I/O) operations on incoming and outgoing messages that are received at the ports. Examples of I/O operations that are implemented by the ports 260 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 255, port 265, etc.) implement the I/O function call operations instead of, or in conjunction with, the ports 260.

In some embodiments, one or more of function calls of the SFE ports 260 can be to one or more service engines 130 that process context-based service rules in the context-based service rule storages 140. Each service engine 130 in some embodiments has its own context-based service rule storage 140, attribute-mapping storage 223, and connection state cache storage 225. FIG. 2 presents just one context-based service rule storage 140, attribute-mapping storage 223, and connection state cache storage 225 for all the service engines in order not to obscure the presentation in this figure with unnecessary detail. Also, in some embodiments, each VM has its own instance of each service engine 130 (e.g., its own instance of discovery engine 120, process control engine 122, encryption engine 124, load balancer 126, and firewall engine 128). In other embodiments, one service engine can service data message flows for multiple VMs on a host (e.g., VMs for the same logical network).

To perform its service operation for a data message flow, a service engine 130 in some embodiments tries to match the flow identifier (e.g., the five-tuple identifier) and/or the flow's associated context attribute set to the rule identifiers of its service rules in its context-based service rule storage 140. Specifically, for a service engine 130 to perform its service check operation for a data message flow, the SFE port 260 that calls the service engine supplies a set of attributes of a message that the port receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set that the service engine has stored for this flow in the attribute-mapping storage 223. As mentioned above, the context engine 110 in some embodiments supplies the context attributes for new flows (i.e., new network connection events) and for new processes to the service engines 130, along with a flow identifier (e.g., a five-tuple identifier) or a process identifier. The context-engine policy storage 143 contains the rules that control the operation of the context engine 110. In some embodiments, these policies direct the context engine to generate rules for the service engines or to direct the service engines to generate rules (e.g., when a high-threat application runs on a VM, directing the encryption engine for all the other VMs on the same host to encrypt their data message traffic). The service engines 130 in these embodiments store the context attributes that they receive from the context engine in the attribute-mapping storage 223.

In some embodiments, a service engine 130 stores the context attribute set for each new flow or new process with that flow's identifier (e.g., five-tuple identifier) or that process' identifier in the attribute-mapping storage. In this manner, the service engine can identify the context attribute set for each new flow that it receives from the SFE ports 260 by searching its attribute-mapping storage 223 for a context record that has a matching flow identifier. The context record with the matching flow identifier includes the context attribute set for this flow. Similarly, to identify the context attribute set for a process event, a service engine in some embodiments searches its attribute-mapping storage 223 for a context record with a matching process identifier.

As mentioned above, some or all of the service engines in some embodiments pull the context attribute sets for a new flow or new process from the context engine. For instance, in some embodiments, a service engine supplies a new flow's five-tuple identifier that it receives from the SFE port 260, to the context engine 110. This engine 110 then examines its attribute storage 145 to identify a set of attributes that is stored for this five-tuple identifier, and then supplies this attribute set (or a subset of it that it obtains by filtering the identified attribute set for the service engine) to the service engine.

As described above, some embodiments implement the pull model by using a service token to encode the attribute set for a new message flow. When notified of a new network connection event, the context engine 110 in some embodiments (1) collects the context attribute set for the new event, (2) filters this set to discard the attributes that are not relevant for performing one or more services on the flow, (3) stores the remaining filtering attribute subset in the attribute storage 145 along with a service token, (4) provides the service token to the GI agent 250. The GI agent 250 then causes this token to be passed to the service engine(s) in-band (e.g., in a header of the data message that the agent's VM sends to a destination) or out-of-band (i.e., separately from the data messages that the agent's VM sends to a destination).

When the service engine gets the new flow through the SFE port 260, it supplies this flow's service token to the context engine, which uses this service token to identify in its attribute storage 145 the context attributes to supply to the service engine. In the embodiments that the SFE port does not provide this service token to the service engine, the service engine first has to identify the service token by searching its data stores using the flow's identifier before supplying the service token to the context engine.

After identifying the contextual attribute set for a data message flow, the service engine 130 in some embodiments performs its service operation based on service rules that are stored in the context-based service rule storage 140. To perform its service operation, the service engine 130 matches the received attribute subset with corresponding attribute sets that are stored for the service rules. In some embodiments, each service rule in the context-based service rule storage 140 has a rule identifier and an action parameter set.

As mentioned above, the rule identifier of a service rule in some embodiments can be defined in terms of one or more contextual attributes that are not L2-L4 header parameters (e.g., are L7 parameters, process identifiers, user identifiers, group identifiers, process name, process hash, loaded module identifiers, consumption parameters, etc.). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute set with the rules, the service engine compares the received attribute set with the associated identifiers of the service rules stored in the context-based service rule storage 140. Upon identifying a matching rule, the service engine 130 performs a service operation (e.g., a firewall operation, a load balancing operation, an encryption operation, other middlebox operation, etc.), based on the action parameter set (e.g., based on Allow/Drop parameters, the load balancing criteria, encryption parameters, etc.) of the matching rule.

In some embodiments, the context-based service rule storage 140 is defined in a hierarchical manner to ensure that a message rule check will match a higher priority rule before matching a lower priority rule, when the message's attribute subset matches multiple rules. Also, in some embodiments, the context-based service rule storage 140 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rule storage 140 based on the message's identified context attribute set, the service engine of some embodiments stores the service rule (or a reference to the service rule) in the connection state cache storage 225, so that it can later use this service rule for subsequent data messages of the same flow.

In some embodiments, the connection state cache storage 225 stores the service rule, or a reference to the service rule, that the service engine 130 identifies for different message identifier sets (e.g., for different five-tuple identifiers that identify different data message flows). In some embodiments, the connection state cache storage 225 stores each service rule, or reference to the service rule, with an identifier (e.g., a flow's five-tuple identifier and/or a hash value of the flow's five-tuple identifier) that is generated from the matching message identifier set.

Before checking with the context-based service rule storage 140 for a particular message, the service rule engine 130 of some embodiments checks the connection state cache storage 225 to determine whether this storage has previously identified a service rule for this message's flow. If not, the service engine 130 identifies the contextual attribute set for the message flow, and then checks the context-based service rule storage 140 for a service rule that matches the message's identified attribute set and/or its five-tuple identifier. When the connection state data storage has an entry for the particular message, the service engine performs its service operation based on this service rule's action parameter set.

In the service architecture of FIG. 2, the DPI module 135 performs deep packet inspection on a data message flow at the direction of the firewall engine 128. Specifically, when the firewall engine 128 receives a new data message that is part of a new data message flow, the firewall engine in some embodiments directs the DPI module to inspect that new data message and one or more of the next few data messages in the same flow. Based on this examination, the DPI engine identifies the type of traffic (i.e., the application on the wire) that is being sent in this data message flow, generates an AppID for this traffic type, and stores this AppID in the attribute storage 145. In some embodiments, the context attribute sets are stored in the attribute storage based on flow identifiers and/or process identifier. Accordingly, in some embodiments, the DPI engine 135 stores the AppID for a new data message flow in the attribute storage 145 based on that flow's five-tuple identifier.

In some embodiments, the context engine 110 pushes to the service engines 130 the AppID for a new data message flow once the DPI engine stores the AppID in the attribute storage 145. In other embodiments, the context engine 110 pulls the AppID from the attribute storage 145 whenever it is queried for the contextual attributes for a data message flow by a service engine. In some embodiments, the context engine 110 uses the five-tuple identifier of the flow to identify the record in the attribute storage 145 with the matching record identifier and the AppID.

Figure 3:
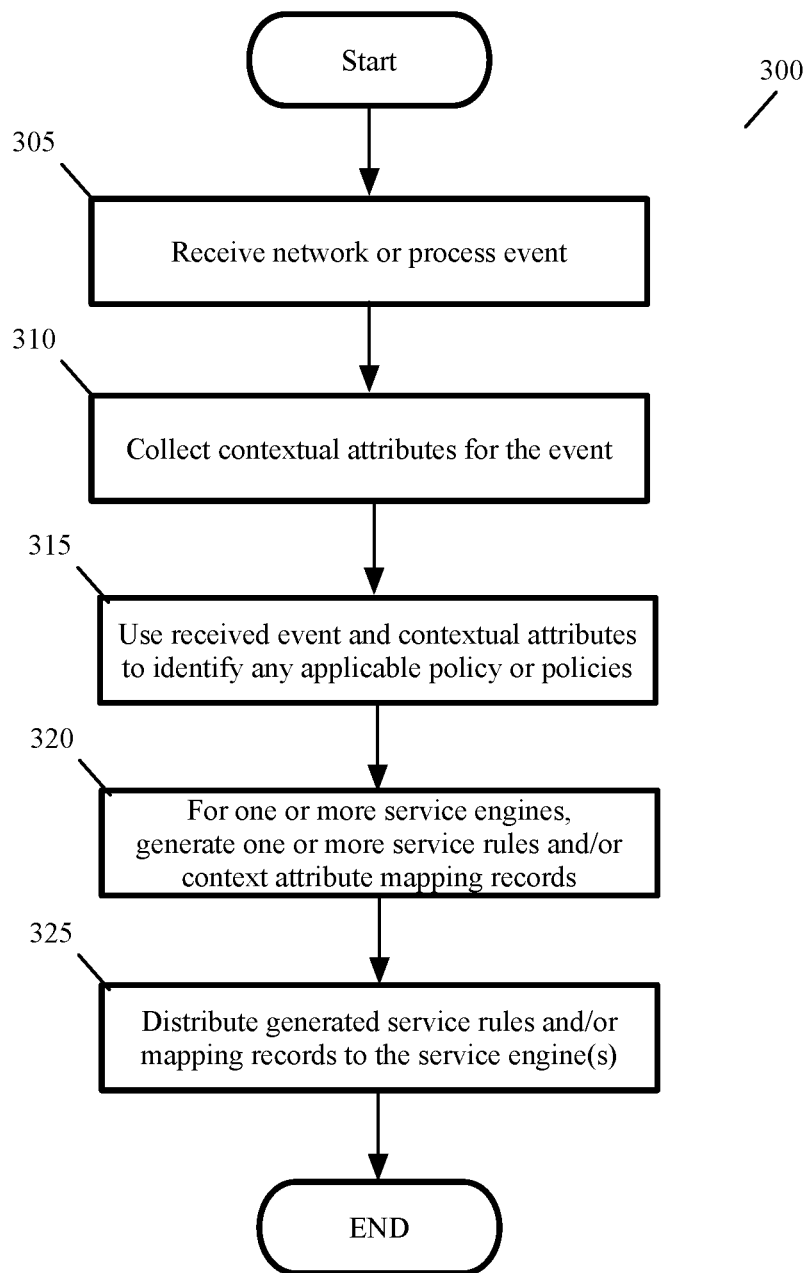
FIG. 3 illustrates a process performed by a context engine of some embodiments.

FIG. 3 illustrates a process 300 that the context engine performs 110 in some embodiments each time it is notified about a new process or network-connection event. From a GI agent 250 of a VM 205, the process 300 initially receives (at 305) a notification regarding a new process or network connection event. Next, at 310, the process 300 collects all the desired contextual attributes regarding the notified event.

As described above, the context engine 110 in some embodiments interacts (at 310) with the reporting GI agent 250 to collect additional information regarding a reported event. The GI agent in some embodiments interacts with the network stack and/or process subsystem in the VM's OS kernel space to collect contextual attributes regarding a process or network event. The GI agent in some embodiments also collects this information from user-space modules (e.g., a user mode dynamic-link library, DLL) that operate in user-space process (e.g., a VMtool.exe) to collect contextual attributes. On VM's using Microsoft Windows, the GI agent in some embodiments registers hooks in the Windows Filtering Platform (WFP) to obtain network events, while registering in the Window's Process Subsystem to collect process related attributes. In some embodiments, the GI agent hook is at the Application Layer Enforcement (ALE) layer of WFP, so that it can capture all socket-connection requests from application processes on the VM.

In some embodiments, the context engine 110 interacts with the management or control plane to collect contextual attributes, and/or to receive records that it can examine to identify contextual attributes for identified network or process events. In some of these embodiments, the context engine interacts with a management or control plane proxy (that operates on its host) in order to obtain data from the management or control plane servers that operate outside of the host. In some of these embodiments, the context engine operates in the kernel space.

After collecting the contextual attributes at 310, the process uses (at 315) the attributes of the received event or the contextual attributes collected for the received event to identify one or more policies in the context-engine policy storage 143. At 315, the process identifies any policy that has a policy identifier that matches the collected attributes and event attributes.

Next, at 320, the process produces context-attribute mapping records for one or more service engines based on the policies identified at 315. One or more of the identified policies might specify that for a particular process or network event, a particular set of service engines need to be notified about the event (e.g., about a new data message flow), with each service engine receiving a subset of contextual attributes that are relevant for that service engine to perform its processing for that event. This operation in some embodiments involves the context engine not including attributes that are not relevant for each particular service engine in the subset of contextual attributes that it provides to that particular service engine.

In some embodiments, certain events might necessitate new service rules to be created for one or more service engines. For example, when a high-threat application is identified on one VM, a policy might specify that other VMs on that host might have to start to encrypt their data message traffic. In some such embodiments, the context-engine policy storage 143 includes policies that direct the context engine to generate service rules for service engines under certain circumstances, or to direct the service engines to generate such service rules. For such embodiments, the process (at 320), if needed, generates service rules for service engines under certain circumstances, or directs the service engines to generate such service rules At 325, the process 300 distributes the mapping records and/or generated service rules/instructions to one or more service engines. As mentioned above, the context engine can employ a push model or a pull model to distribute such records and/or rules/instructions. When employing a pull model, the process 300 in some embodiments not only performs the operation 325 in response to a query from a service engine, but also performs some or all of the operation 320 in response to this query. After 325, the process ends.

Figure 4:
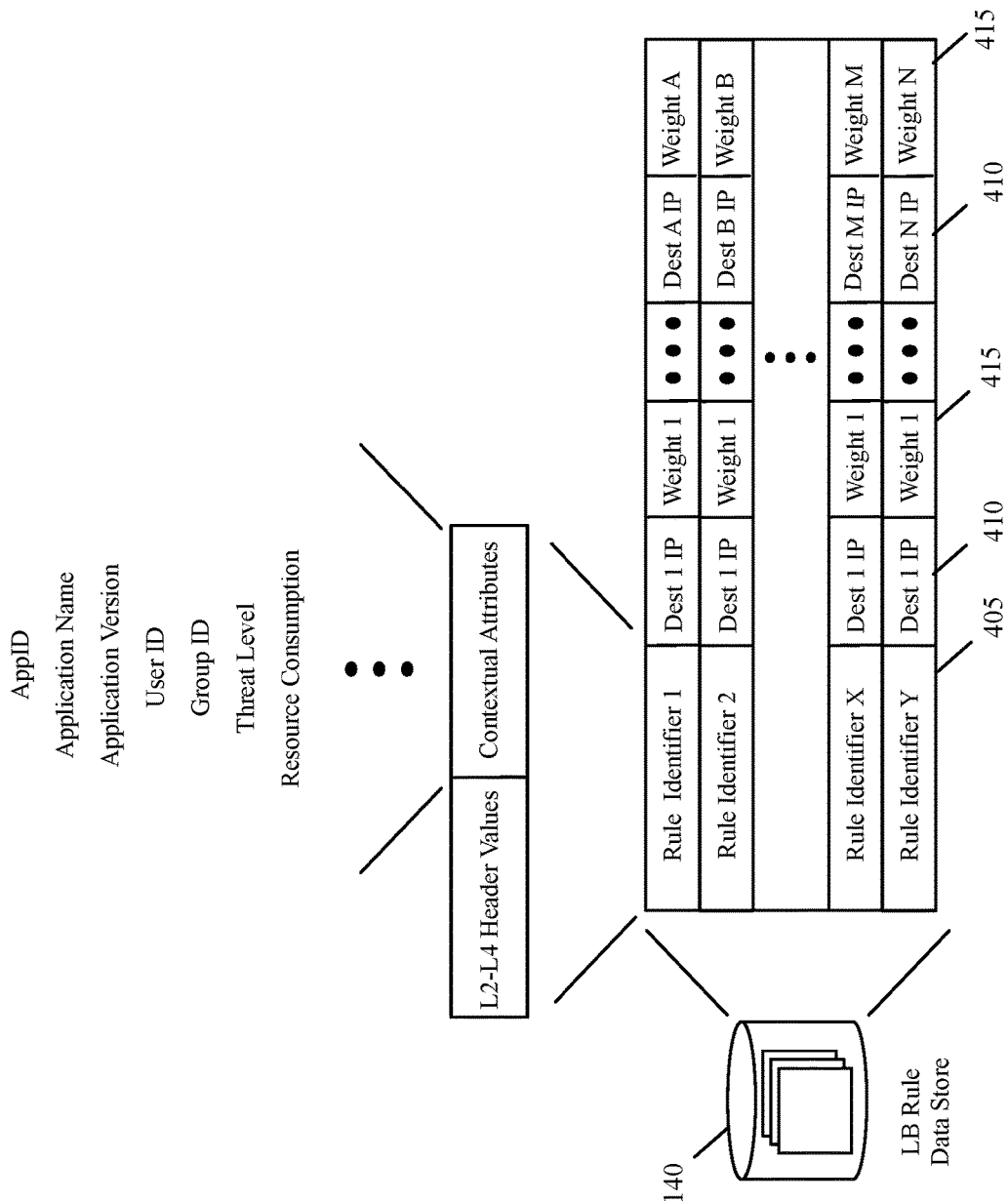
FIG. 4 illustrates examples of load-balancing rules of some embodiments.
Figure 5:
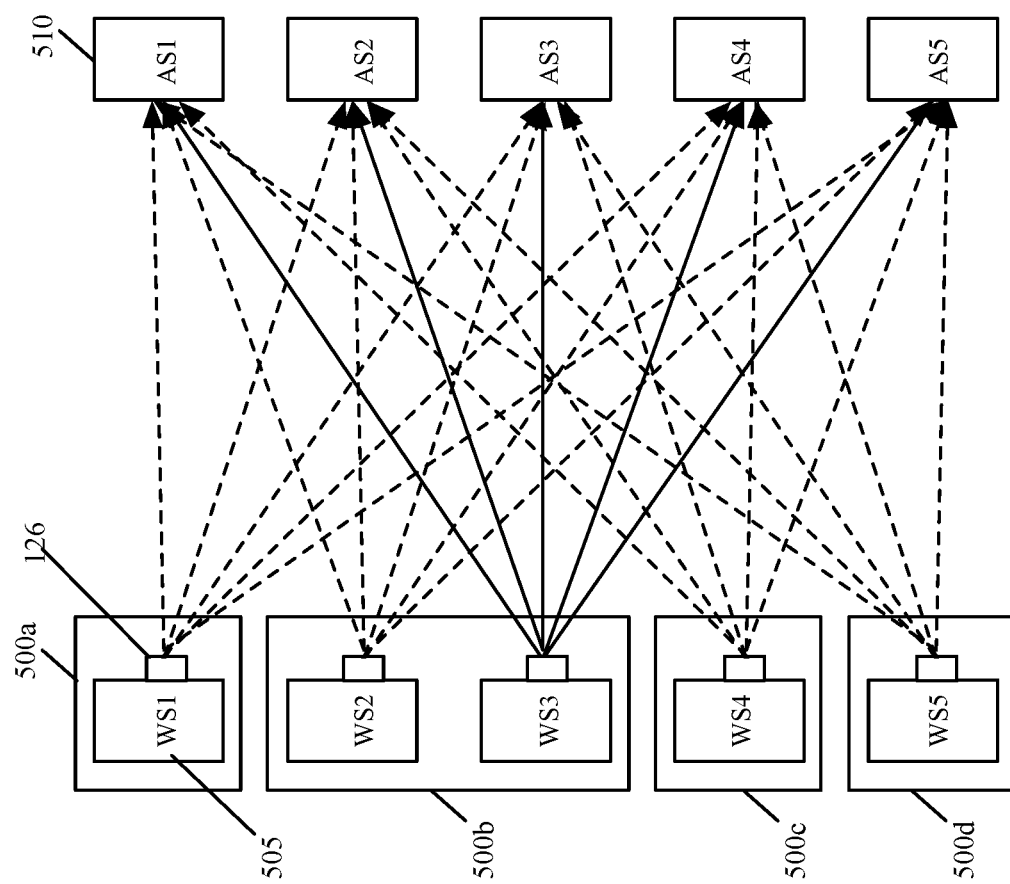
FIG. 5 illustrates load balancers of some embodiments distrusted webserver traffic amongst several application servers.

The load balancing engine 126 is a context-based load balancer that performs its load balancing operations based on load-balancing rules that can be specified in terms of not only L2-L4 parameters, but also in terms of contextual attributes. FIG. 4 illustrates an example of such context-based load balancing rules. These rules are used independently by different load balancing engines 126 on different hosts 500 to distribute data messages from different webserver VMs 505 on these hosts to different application server VMs 510, as shown in FIG. 5. In some embodiments, the hosts 500 are similar to the host 200, and the webserver VMs 505 and the application server VMs 510 are similar to the VMs 205 of FIG. 2. To avoid obscuring the figure with unnecessary detail, the only components of hosts 500 that are shown in FIG. 5 are the load balancers 126 and the webserver VMs 505, with the load balancers appearing as service modules in the egress path of the webservers VMs 505.

In the example illustrated in FIG. 5, the load balancers 126 collectively form a distributed load balancer (i.e., a single, conceptual logical load balancer) that spans across the multiple hosts to distribute webserver VM traffic uniformly across the application server VMs. As further described below, the load balancing criteria of the load-balancing rules for the different load balancers 126 in some embodiments is the same to ensure uniform treatment of the webserver VM traffic. As shown by host 500b, multiple webserver VMs 505 can execute on the same host 500, with each of these webserver VMs being serviced by a different load balancer 126. In other embodiments, one load balancer can service multiple VMs on the same host (e.g., multiple VMs for the same tenant on the same host). Also, in some embodiments, multiple application server VMs can execute on the same host with each other and/or with the webserver VMs.

In the examples illustrated in FIGS. 4-5, the load balancers 126 perform a destination network address translation (DNAT) that transforms a virtual IP (VIP) address for the application servers to a specific application VM's IP address, called a destination IP address or a DIP. In other embodiments, the DNAT operation can translate other network addresses, e.g., it can translate the MAC address to effectuate a MAC-redirect. Also, even though the load balancers in FIGS. 4-5 distribute webserver traffic among the application servers of an application server group (cluster), the load balancers can be used to distribute traffic from any set of one or more service or compute nodes among the service or compute nodes of any service/compute node cluster.

FIG. 4 illustrates a load-balancing (LB) rule storage 140 that stores several LB rules, with each LB rule associated with one load-balanced compute or service cluster. Each load-balance rule includes (1) a rule identifier 405, (2) several IP addresses 410 of several nodes of the load-balanced node group, and (3) a weight value 415 for each IP address. Each rule identifier 405 specifies one or more data tuples that can be used to identify a rule that matches a data message flow.

In some embodiments, a rule identifier can include a VIP address (such as the VIP address of the application server group in FIG. 5) of the rule's associated DCN group. As shown, the rule identifier can include in some embodiments any L2-L4 parameters (e.g., source IP address, source port, destination port, protocol, etc.). Also, as shown, the rule identifier for a LB rule can include contextual attributes, such as AppID, application name, application version, user ID, group ID, threat level, resource consumption, etc. In some embodiments, a load balancer searches a LB data storage by comparing one or more message attributes (e.g., five-tuple header values, contextual attributes) with the rule identifiers 405 to identify the highest priority rule with a matching rule identifier.

Each LB rule's IP addresses 410 are the IP addresses of the compute or service node that are members of the load-balanced compute or service group that is associated with the rule (e.g., of the load-balanced group that is associated with a VIP address specified in the rule's identifier 405). As further described below, the addresses of these nodes are supplied in some embodiments by a controller set that configures the load balancers. In some embodiments, the load balancer translates the destination IP address of a received data message to one of the IP addresses 410 (e.g., translates a VIP contained in the data message to a DIP).

In some embodiments, a load balancer performs its load-balancing operation based on one or more load-balancing criteria. The LB rules of some embodiments contain such LB criteria, in order to specify within each rule how the load balancer should spread the traffic across the nodes of a load-balanced group when a message flow matches that rule. In the example illustrated in FIG. 4, the load-balancing criteria is a weighted round robin scheme that is defined by the weight values 415 of each rule. Specifically, the weight values 415 for each IP address of each LB rule provides the criteria for a load balancer to spread the traffic to the nodes of a LB node group.

For instance, the application server group of FIG. 5 has five application servers. Assume that the load-balancing rule for distributing the webserver traffic amongst these five application servers specifies the weight values of 1, 3, 1, 3, and 2 for the five IP addresses of the five application servers. Based on these values, a load balancer would distribute data messages that are part of ten new flows in the following order: first flow to the first IP address, second to fourth flow to the second IP address, fifth flow to the third IP address, sixth to eighth flow to the fourth IP address, and ninth and tenth flow to the fifth IP address. According to this scheme, the assignment of the next batch of new flows loops back through these IP addresses (e.g., the eleventh flow would be assigned to the first IP address and so on).

In some embodiments, the weight values for an LB rule are generated and adjusted by the controller set based on the LB statistics that the load balancers (1) collect regarding the data message flows that they distribute amongst the nodes of the LB node group(s) and (2) provide to controller set. Also, to gracefully switch between different load-balancing criteria, the LB rules in some embodiments specify time periods for different load-balancing criteria of a LB rule that are valid for different periods of time. Accordingly, in some embodiments, a load-balancing rule might specify multiple different sets of destination network addresses with different temporal values that specify when each set of addresses is valid. Each of these sets in some embodiments can include its own set of LB criteria (e.g., its own set of weight values).

Figure 6:
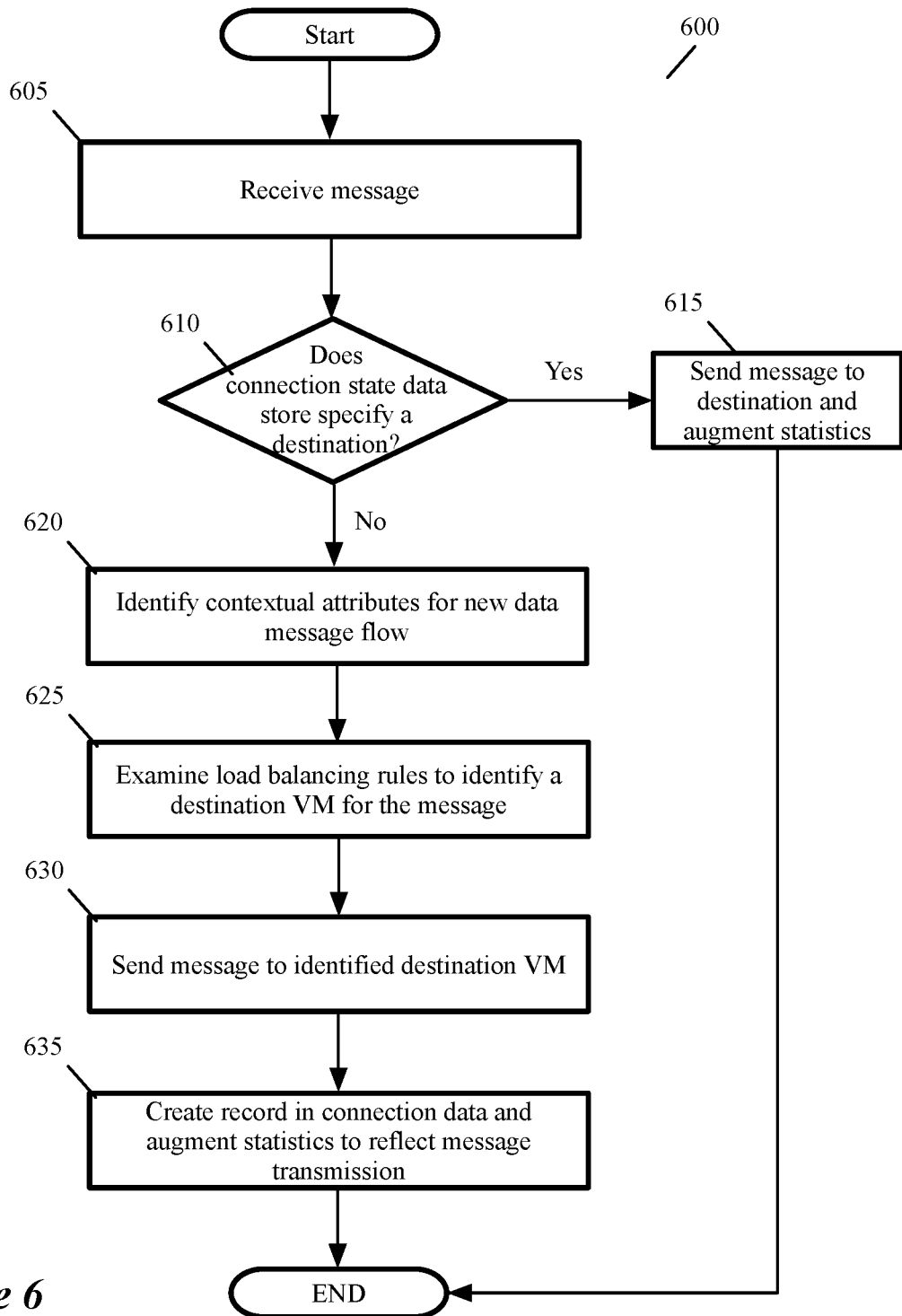
FIG. 6 illustrates a process that the load balancer performs in some embodiments.

FIG. 6 illustrates a process 600 that the load balancer 126 performs in some embodiments. As shown, the process 600 starts when the load balancer receives (at 605) a data message from its corresponding SFE port 260. This port relays this message when it receives the data message from its VM or for its VM. In some embodiments, the port relays the data message by passing to the load balancer a reference (e.g., a handle that identifies a location in memory that stores the data message) to the data message or the data message's header values.

The process determines (at 610) whether the connection state cache 225 stores a record that identifies the destination to which the data message should be forwarded. As mentioned above, each time a load balancer uses a LB rule to direct a new data message flow to a node of a load-balanced node group, the load balancer in some embodiments creates a record in the connection state cache 225 to store the physical IP address of the selected node, so that when the load balancer receives another data message within the same flow (i.e., with the same five-tuple identifier), it can forward it to the same node that it used for previous data messages in the same flow. The use of the connection state cache 225 allows the load balancer 126 to process the data message flows more quickly. In some embodiments, each cached record in the connection state cache 225 has a record identifier that is defined in terms of data message identifiers (e.g., five-tuple identifiers). In these embodiments, the process compares the received data message's identifier (e.g., five-tuple identifier) with the record identifiers of the cached records to identify any record with a record identifier that matches the received data message's identifier.

When the process 600 identifies (at 610) a record for the received data message's flow in the connection state cache 225, the process (at 615) then replaces the message's destination address (e.g., the VIP address) with the destination address (e.g., the DIP) that is stored in the record in the connection state cache 225. At 615, the process sends the address-translated data message along its datapath. In some embodiments, this operation entails returning a communication to the SFE port 260 (that called the load balancer to initiate the process 600) to indicate that the load balancer is done with its processing of the VM data message. The SFE port 260 can then handoff the data message to the SFE, or can call another service engine in the I/O chain operator to perform another service operation on the data message. At 615, the process 600 also updates in some embodiments the statistics that it maintains regarding its data message flow processing. After 615, the process 600 ends.

When the process 600 determines (at 610) that the connection state cache 225 does not store a record for the received data message's flow, the process 600 identifies (at 620) one or more contextual attributes for this data message flow. As mentioned above, the service engines of different embodiments perform this operation differently. For instance, in some embodiments, the load balancer 126 checks the attribute-mapping storage 223 for a record that has a record identifier that matches the received data message's header values (e.g., its five-tuple identifier). It then uses (at 620) the contextual attribute set of this matching record as the contextual attribute set of the received data message flow.

In other embodiments, the load balancer 126 queries the context engine to obtain the contextual attribute set for the received data message. With this query, the load balancer supplies the received message's flow identifier (e.g., five-tuple identifier) or its associated service token. The context engine then uses the message's flow identifier or its associated service token to identify a set of contextual attributes in its context attribute storage 145, and it then provides the identified set of contextual attributes to the load balancer 126, as explained above.

Once the process 600 has obtained the contextual attribute set for the received data message, it uses this attribute set along with the message's other identifiers to identify (at 625) an LB rule in the LB rule storage 140 for the data message received at 605. For instance, in some embodiments, the LB rules have rule identifiers 405 that are defined in terms of one or more of the five-tuple attributes along with one or more contextual attributes, such as application name, application version, user ID, group ID, AppID, threat level, resource consumption level, etc. To identify the LB rule in the LB rule storage 140, the process in some embodiments compares the contextual attributes and/or other attributes (e.g., five-tuple identifier) of the received data message with the rule identifiers (e.g., rule identifiers 405) of the LB rules to identify the highest priority rule that has an identifier that matches the message's attribute set.

In some embodiments, the process uses different message-attribute sets to perform this comparison operation. For instance, in some embodiments, the message attribute set includes the destination IP address of the message (e.g., the VIP of the addressed node group) along with one or more contextual attributes. In other embodiments, the message attribute set includes other attributes, such as one or more of the other five-tuple identifiers (e.g., one or more of the source IP, source port, destination port, and protocol). In some embodiments, the message attribute set includes logical network identifiers such as virtual network identifier (VNI), virtual distributed router identifier (VDRI), a logical MAC address, a logical IP address, etc.

As mentioned above, each LB rule in some embodiments includes two or more destination addresses (e.g., IP addresses 410), which are the destination addresses (e.g., IP addresses) of the nodes that are members of the load-balanced node group. When the process identifies an LB rule (at 630), it selects one of the destination addresses (e.g., IP addresses) of the rule to replace the virtual address (e.g., the VIP address) in the message. Also, as mentioned above, each LB rule in some embodiments stores a set of load-balancing criteria for facilitating the process' selection of one of the destination addresses of the LB rule to replace the message's virtual destination identifier. In some embodiments, the stored criteria are the weight and/or times values that were described above by reference to FIGS. 4 and 5. Accordingly, in some embodiments, the process 600 selects one of the matching rule's destination addresses based on the selection criteria stored in the rule, and changes the message's destination address to the selected destination address.

After changing the destination address of the data message, the process (at 630) sends the data message along its datapath. Again, in some embodiments, this operation entails returning a communication to the SFE port 260 (that called the load balancer to initiate the process 600) to indicate that the load balancer is done with its processing of the VM data message. The SFE port 260 can then handoff the data message to the SFE or the VM, or can call another service engine in the I/O chain operator to perform another service operation on the data message.

After 630, the process transitions to 635, where in the connection state cache storage 225, it creates a record to identify the compute or service node in the load-balanced group (i.e., to identify the node destination identifier) to use to forward data messages that are part of the same flow as the data message received at 605. At 635, the process 600 also updates the statistics that it maintains for the node to which the message was addressed by the process 600. This update reflects the transmission of a new data message to this node. After 635, the process ends.

Because of its use of contextual attributes to define the rule identifiers of the LB rules, the context-based load balancer 126 can distribute the data message flows based on any number of contextual attributes. As mentioned above, examples of such load-balancing operations include: (1) distributing data message flows associated with the Finance department on all load-balancing pools, (2) redirecting all the Finance department's traffic to another pool when the primary pool for this department is down to make this department's traffic highly available, (3) making all traffic associated with the Doctor's user group highly available, and (4) distributing data message flows for Finance applications amongst the service nodes of a low-latency service node group. In some embodiments, the load-balancing rules can also be defined in terms of collected resource consumption, in order to distribute traffic to provide more or less resources to applications that consume a lot of resources on the DCNs.

In some embodiments, the management plane obtains an inventory of all processes and services that are running on the VMs on the hosts in a datacenter. The discovery engine 120 of a host 200 in some embodiments assists in collecting this data from the VMs executing on its host. In some embodiments, the inventoried process/services are referred to as the inventoried applications, which include all client processes, services or daemons that utilize network input/output and all server processes that have registered to listen to (i.e., to obtain messages) certain network connections. The discovery engine collects this data using the GI agents 250 and the MUX 227 in some embodiments.

Based on the data collected by all the discovery engines on all the hosts, the management servers (e.g., the network managers and/or compute managers) build the inventory of the running applications. In some embodiments, each application is identified by comparing its file hash obtained from the VMs 205 with hashes of application files stored in the application data storage of the management plane. The management plane in some embodiments has the discovery engines update their data collection so that the management plane can refresh its inventory on a scheduled basis.

The management plane in some embodiments then provides a rule creation interface for allowing administrators to create context-based LB rules and/or policies for the LB engines 126 (as well as service rules for the other service engines 130). The rule creation interface allows the administrators to define high-level LB policies (and other service policies) based on applications inventoried through the data collected by the discovery engines 120, and contextual attributes collected by the context engines 110 and by the management plane's interface with other management server clusters.

Once the high-level LB policies (and other service policies) are defined in the management plane, the management plane directly supplies some or all of these policies to the management proxies (not shown) on the hosts 200, and/or indirectly supplies some or all of these policies to these proxies through a set of controllers (e.g., network controllers). In some embodiments, the management proxies publish the received policies as rules to the context-based service rule storages 140. In some embodiments, the proxies transform these policies before publishing them to the context-based service rule storages 140. For instance, in some embodiments, the policies are published with AppliedTo tuples that identify the service nodes and/or logical networks to which they are associated. In some of these embodiments, the management proxies on the hosts remove the AppliedTo tuple from each service policy, before pushing the policy as a service rule to the service rule storage 140. Also, as mentioned above, the context engines 110 on the hosts 200 in some embodiments resolve the policies based on collected contextual attributes, in order to generate rules for the service engines.

Figure 7:
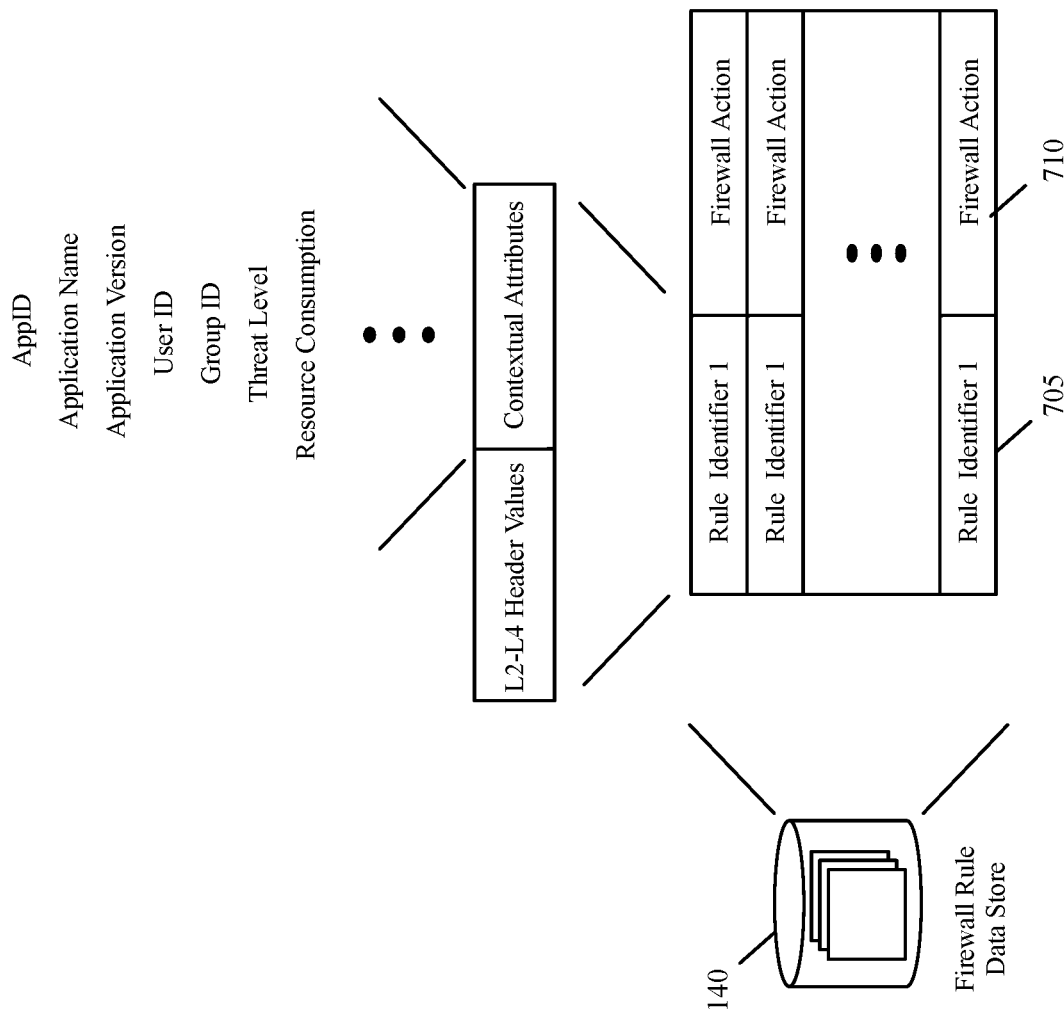
FIG. 7 illustrates several examples of such firewall rules.

The firewall engine 128 is a context-based firewall engine that performs its firewall operations based on firewall rules that can be specified in terms of not only L2-L4 parameters, but also in terms of contextual attributes. FIG. 7 illustrates several examples of such firewall rules. This figure illustrates a firewall rule data store 140 of some embodiments. As shown, each firewall rule includes a rule identifier 705 and a firewall action parameter 710.

In some embodiments, a firewall action parameter 710 can specify any one of the traditional firewall actions, such as Allow, Drop, Re-Route, etc. Each rule identifier 705 specifies one or more data tuples that can be used to identify a rule that matches a data message flow. As shown, a rule identifier can include in some embodiments any L2-L4 parameters (e.g., source IP address, source port, destination port, protocol, etc.). One or more of these parameters can be virtual parameters (e.g., a VIP of a destination cluster) or a logical identifier (e.g., a logical network identifier).

In some embodiments, a rule identifier can also include contextual attributes, such as AppID, application name, application version, user ID, group ID, threat level, and resource consumption. In some embodiments, a firewall engine searches a firewall data storage by comparing one or more message attributes (e.g., five-tuple header values, contextual attributes) with the rule identifiers 705 to identify the highest priority rule with a matching rule identifier.

In some embodiments, different firewall engines 128 on different hosts enforce the same set of firewall rules. For instance, in some embodiments, different firewall engines 128 process the same firewall rules on different hosts for VMs of one logical network in order to provide a level of security on data messages that are transmitted by or received for these VMs. For this logical network, these firewall engines 128 collectively form a distributed firewall engine (i.e., a single, conceptual logical firewall engine) that spans across the multiple hosts.

FIG. 8 illustrates several more detailed examples of the context-based firewall rules of some embodiments. In these examples, the rule identifier 705 of each rule is expressed in terms of the five-tuple identifier and one or more contextual attributes. Each rule has one or more attributes in its five-tuple identifier that are wildcard values designated by an asterisk in order to specify that the value of these attributes do not matter (i.e., the data message flow can have any value for these attributes without failing to match the rule).

The first rule 835 specifies that all data message flows from Skype version 1024 should be dropped. The rule identifier for this rule is expressed only in terms of the contextual attributes of the data message flow. As mentioned above, and further described below, each time the firewall engine 128 identifies a new data message flow, it identifies the flow's contextual attributes by interacting with the context engine or by examining the records in its attribute-mapping storage 223 to identify a record that specifies the contextual attributes for the flow's five-tuple identifier.

The second rule 830 specifies that all data message flows that have a Group ID equal to Nurses and AppID equal to YouTube traffic are to be dropped. By enforcing this rule, the firewall engine 128 can make sure that nurses that login to its VM 205 cannot view YouTube traffic. Again, the rule identifier for this rule is expressed only in terms of the contextual attributes of the data message flow. In this example, the contextual attributes are the Group ID and the AppID.

Figure 9:
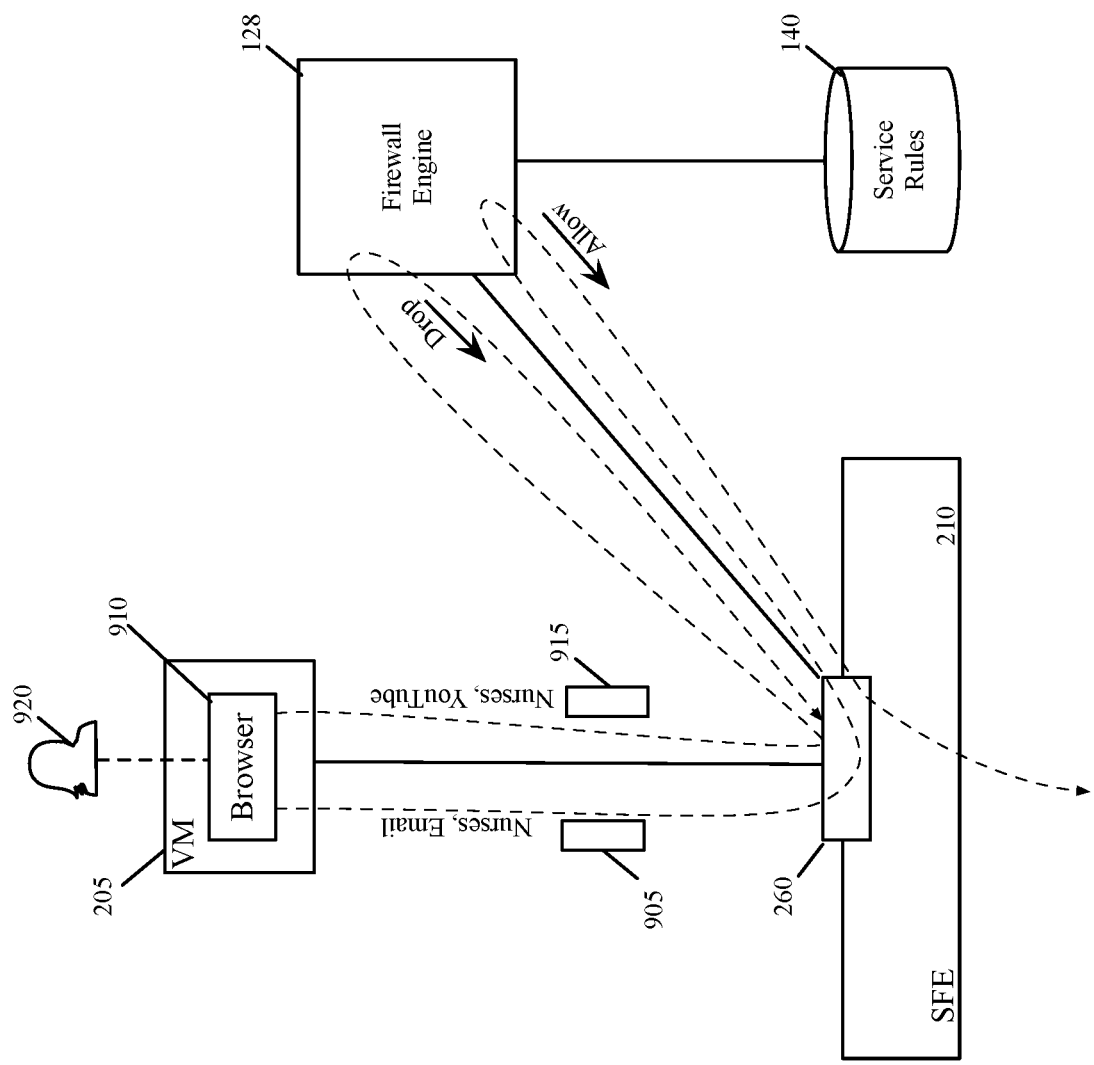
FIGS. 9-12 present various examples that illustrate the enforcement of various context-based firewall rule by a firewall engine.

FIG. 9 presents an example that illustrates the enforcement of the second rule 830 by the firewall engine 128. Specifically, it shows this firewall engine 128 allowing a first data message 905 from a browser 910 to pass through, while blocking a second data message 915 from this browser. As shown, both these data messages are associated with an operation that a nurse 920 has performed on the browser. The first data message flow is allowed to pass through as it relates to an email that the nurse is sending through the browser. This firewall engine 128 allows this message to go through because it does not match any firewall rule that requires the message to be blocked. The firewall engine 128, on the other hand, blocks the second data message as it relates to the nurse trying to watch a YouTube video, and this type of data message flow is prohibited by rule 830.

The third rule 825 in FIG. 8 specifies that all data message flows that are associated with a high threat level indicator should be blocked if they are going to a particular destination IP address A. The rule identifier for this rule is defined in terms of a contextual attribute (i.e., the high threat level indicator) and one attribute (the destination IP address) in the five-tuple identifier of the data message.

Figure 10:
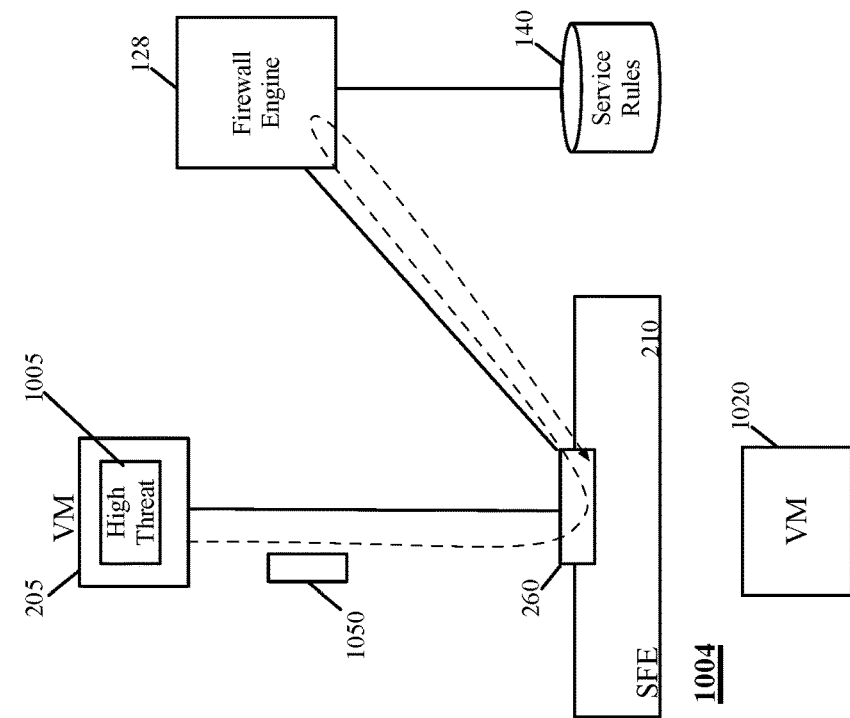
Figure 10:
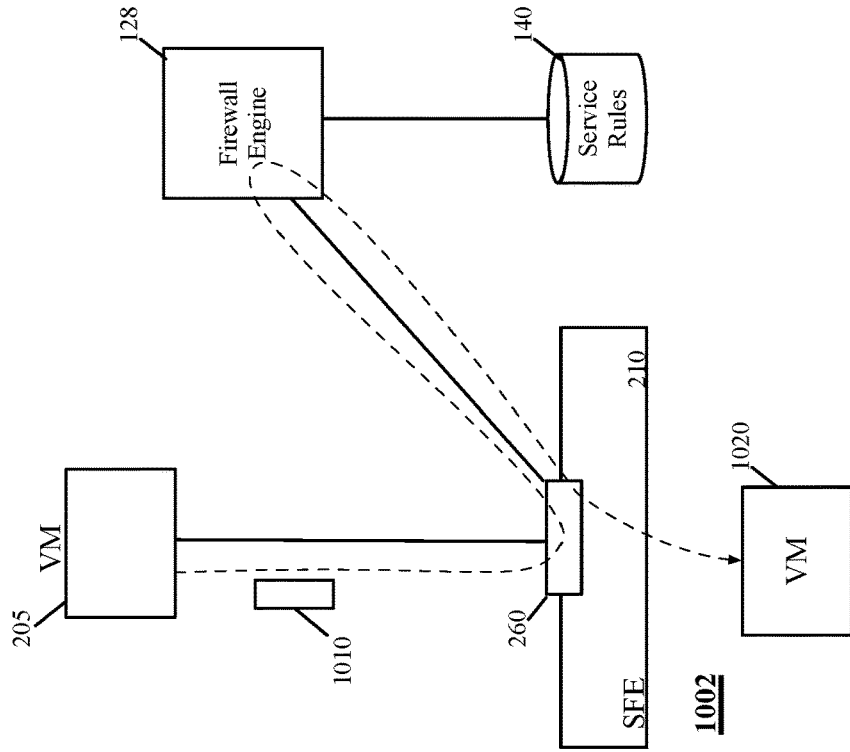

FIG. 10 presents an example that in two stages illustrates the enforcement of this rule 825 by the firewall engine 128. Specifically, it shows in a first stage 1002 the firewall engine 128 allows data messages 1010 to pass from a VM 205 to another VM 1020 (outside of the host) that has the particular destination IP address A. In the second stage 1004, an application 1005 is installed on the VM 205. This application is designated as a high threat application by the threat detector 132. Whenever a new data message flow starts on the VM, the context engine associates this data message flow with a high threat level tag. Accordingly, in the second stage 1004, the firewall engine 128 blocks a data message 1050 from the VM 205 to the other VM 1020 as this data message is associated with the high threat level, and the rule 815 prohibits such a data message to be sent to IP address A of the VM 1020.

The fourth and fifth rules 820 and 815 in FIG. 8 specify that data messages associated with the Doctor and Nurses groups can access VMs associated with a VIP address A, while data messages associated with the Accountant group cannot access these VMs. The rule identifier for the fourth rule is defined in terms of two contextual attributes (i.e., Doctor and Nurse group identifiers) and one attribute (the VIP destination address A) in the five-tuple identifier of the data message. The rule identifier for the fifth rule is defined in terms of one contextual attribute (i.e., Accountant group identifier) and one attribute (the VIP destination address A) in the five-tuple identifier of the data message. In some embodiments, the VIP address is an address of a cluster of VMs that perform the same function, and a load balancer will translate this VIP address to the IP address of one of the VMs in the cluster.

Figure 11:
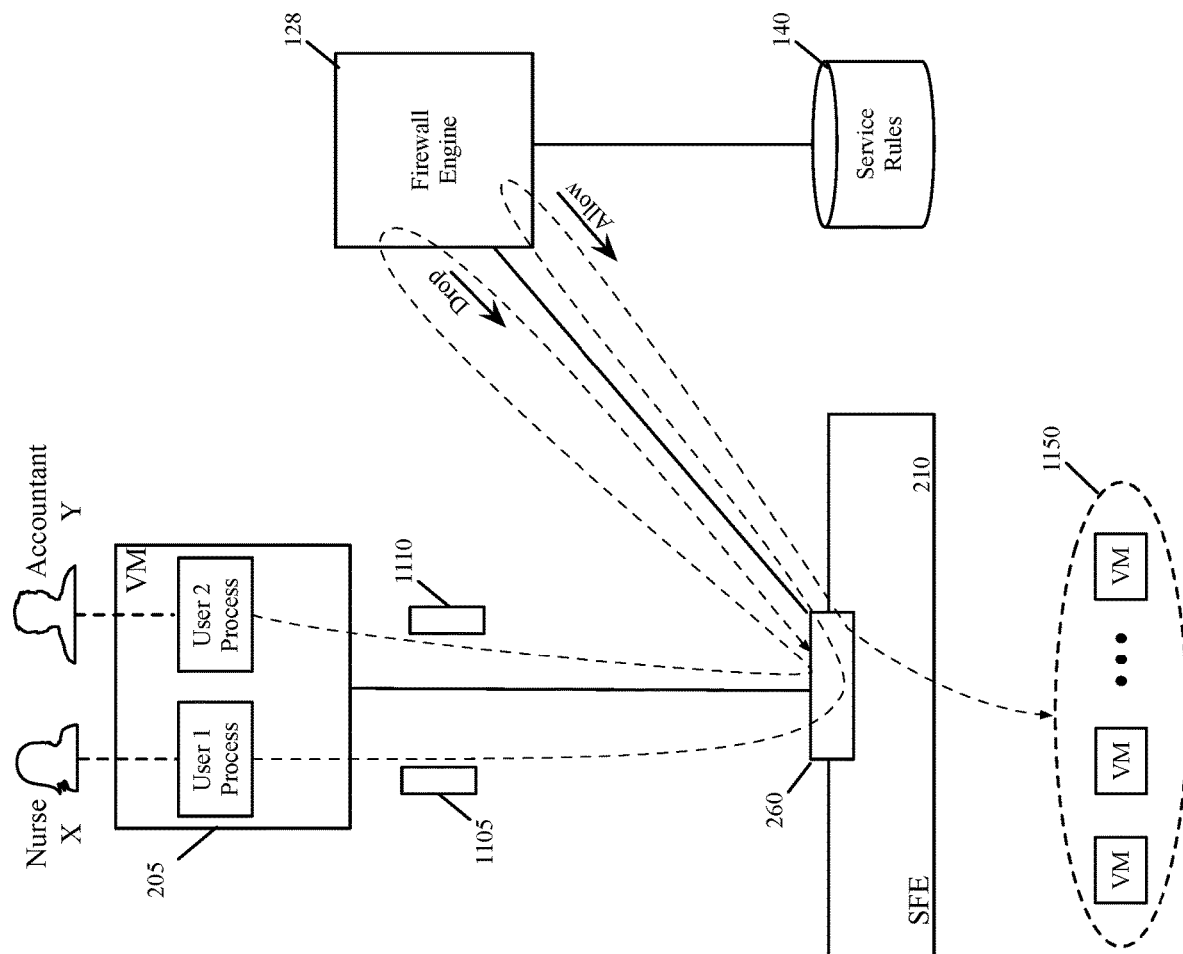

FIG. 11 presents an example that illustrates the enforcement of the fourth and fifth rules 820 and 815 by the firewall engine 128. Specifically, it shows two users concurrently logged into one VM that is acting as a terminal server. One of these users is a Nurse X, while another user is an accountant Y. FIG. 11 further shows that the firewall engine 128 allows a first data message 1105 from the Nurse X's session to pass through to a VM in a VM cluster 1150 identified by the destination IP address VIP A. It also shows the firewall engine blocking a second data message 1110 from the Accountant Y's session from reaching any of the VMs in this VM cluster, because the fifth rule 815 prevents data messages that are associated with the Accountants Group ID to reach the destination IP address VIP A.

In FIG. 11, the two data messages are for two different actual users who are concurrently logged into a VM. In other cases, only one user might be actually logged onto a VM, but administrative processes might be running on the VM in conjunction with the processes that run for the applications started by the logged in user. The administrative processes can be services/daemons running in a VM in a different user context than the logged in user. Services generally run in admin/root context and not in the logged in user context. This is a potential security hole as it might allow any application running in a non-logged on user context to access a network resource. Accordingly, even when only a single user is logged into a VM, it can be desirable to specify firewall rules that treat differently the data messages associated with background administrative processes from data messages associated with processes that run for the applications started by the logged in user.

As an example, the sixth rule 810 allows data messages of processes associated with the applications operated by an individual in the High Security Group to access other VMs with sensitive data (in this example, these VMs are part of a cluster of VMs associated with an IP address VIP B), while the seventh rule 805 blocks data messages associated with background administrative processes from accessing such VMs. This is useful for ensuring that IT personnel or hackers cannot create a back door to access sensitive data by installing administrative processes that access high security VMs that piggyback off the login session of a user with the appropriate clearance.

Figure 12:
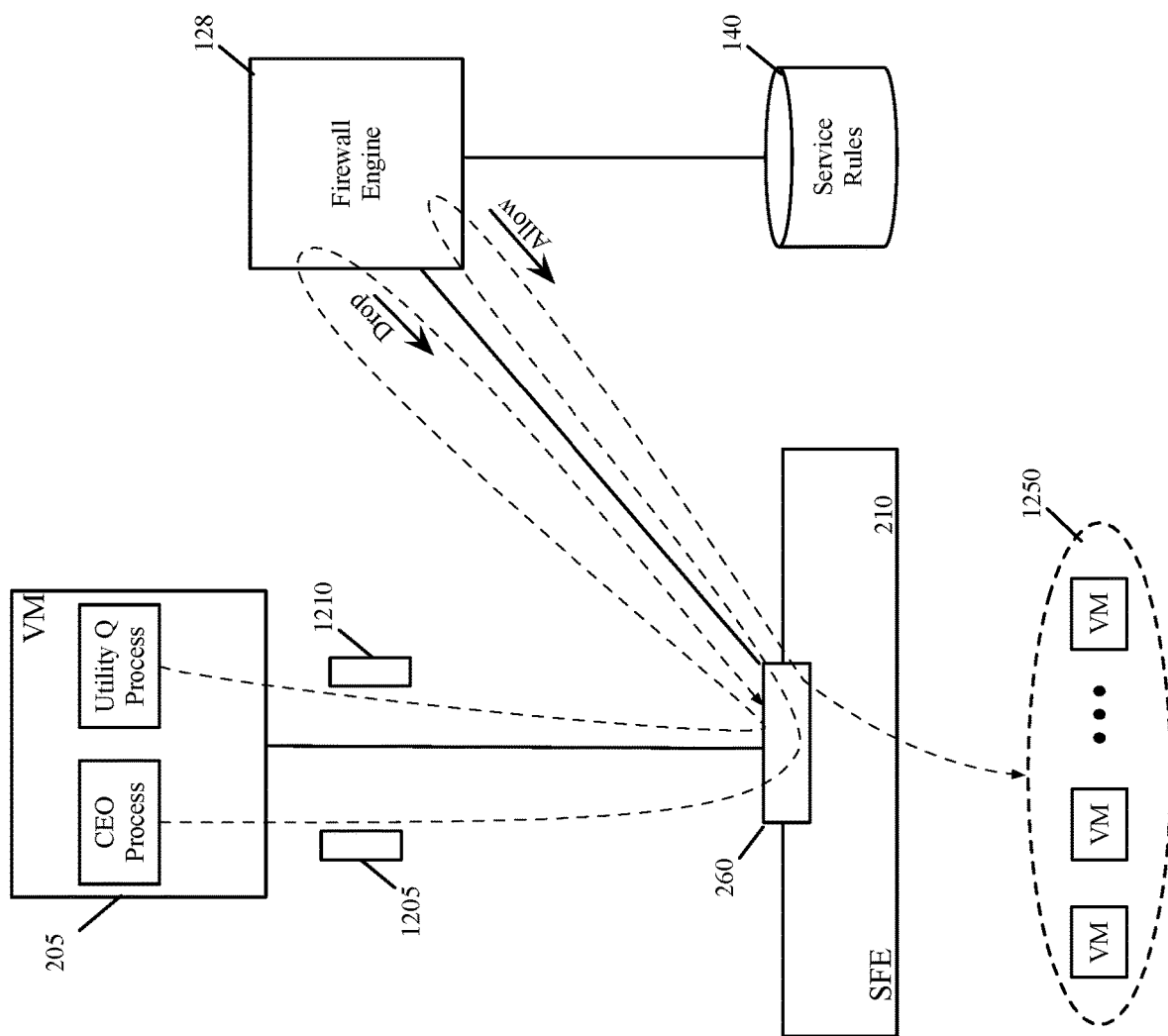

FIG. 12 presents an example that illustrates the enforcement of the sixth and seventh rules 810 and 805 by the firewall engine 128. Specifically, it shows two data message flows concurrently emanating from one VM. One data message flow is associated with the CEO, while another is associated with a background IT utility process called Utility Q. FIG. 12 further shows that the firewall engine 128 allows a data message 1205 from the CEO's session to pass through to a VM in a high security cluster 1250 identified by the VIP address B. It also shows the firewall engine blocking a second data message 1210 from the Utility Q's session from reaching any of the VMs in the high security cluster, because the seventh rule 805 prevents data messages that are associated with administrative processes (such as the Utility Q process) from reaching the VIP address B.

Figure 13:
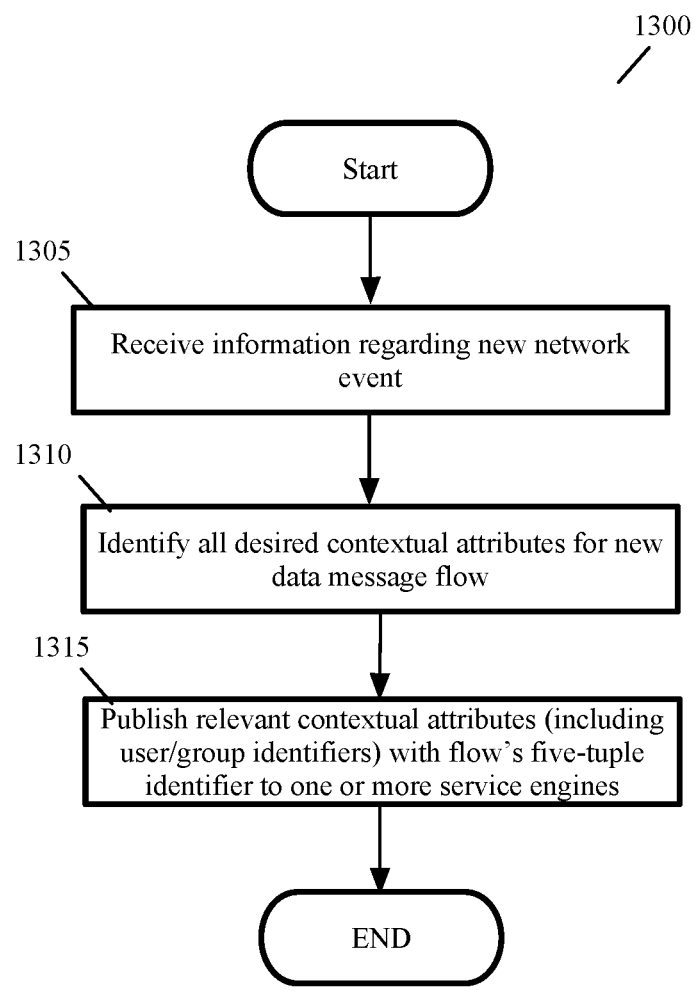
FIG. 13 illustrates a process that the context engine performs to collect the user and group identifiers each time it receives a new network connection event from a GI agent.

The firewall engine can differentiate the data message flows for two different processes that run concurrently on a VM for two different login/administrative credentials because the context engine collects the user and group identifiers for each data message flow when each flow starts, and associates each flow with its user and group identifiers. FIG. 13 illustrates a process 1300 that the context engine performs to collect the user and group identifiers each time it receives a new network connection event from a GI agent.

The process 1300 initially receives (at 1305) a notification of a new network connection event from a GI agent 250 on a VM 205. As mentioned above, the GI agent in some embodiments provides the following information in a new network connection notification: the connection's five-tuple identifier, the identifier of the process requesting the network connection, a user identifier associated with the requesting process, and a group identifier associated with the requesting process.

Next, at 1310, the process 1300 queries the GI agent to collect any other contextual attributes needed for the new network connection event. Examples of such additional parameters include additional parameters associated with the process requesting the network connection. At 1315, the process 1300 then publishes one or more context attribute records to one or more service engines. In some embodiments, each context attribute record to each service engine includes the connection's five-tuple identifier and a set of one or more context attributes, including the user identifier and/or the group identifier. The service engines then store the provided contextual attribute records in their attribute-mapping storages 223, so that they can use these records to identify the context attribute sets associated with different data message flows that they process. For service engines that have different service rules for different processes concurrently running on a VM for different user accounts, the context attribute sets include a user identifier or a group identifier to allow these service engines to associate different data message flows from the VM to different user/group identifiers.

In some embodiments, the context engine does not include in a service engine's context attribute record the contextual attributes that are not needed by the service engine. Also, in some embodiments, the context engine provides different context attribute records to different context engines for the same network connection event, because different service engines need different sets of context attributes. As described above, the context engine 110 in some embodiments does not push the context attribute sets for new network connections to some or all of the service engines, but rather has these service engines pull these attribute sets.

In some embodiments, the context engine can associate a data message flow on a source host with the source VM (i.e., the VM that is the source of the data message flow) with a contextual attribute of a destination VM on the same host or a different destination host. The firewall engine 128 in these embodiments can then use such destination-based contextual attributes to resolve firewall rules. For instance, the firewall engine can drop all data messages addressed to a particular type of server (e.g., a Sharepoint server). To support such destination-based rules, the context engines of some embodiments directs the GI agents to identify the processes that register for notifications on particular ports, and uses this information along with process identifiers and hashes to identify the applications that serve as destinations of data message flows. The information collected by the context engines on the different hosts are collected by the management plane (e.g., by management servers that operate on separate computers or on the same hosts that execute the VMs), which aggregates this data and distributes the aggregated data to the other context engines. The distributed information can then be used by the context engines on the host to resolve contextual policies on these hosts, in order to supply context-based rules to the context-based service engines on these hosts.

Figure 14:
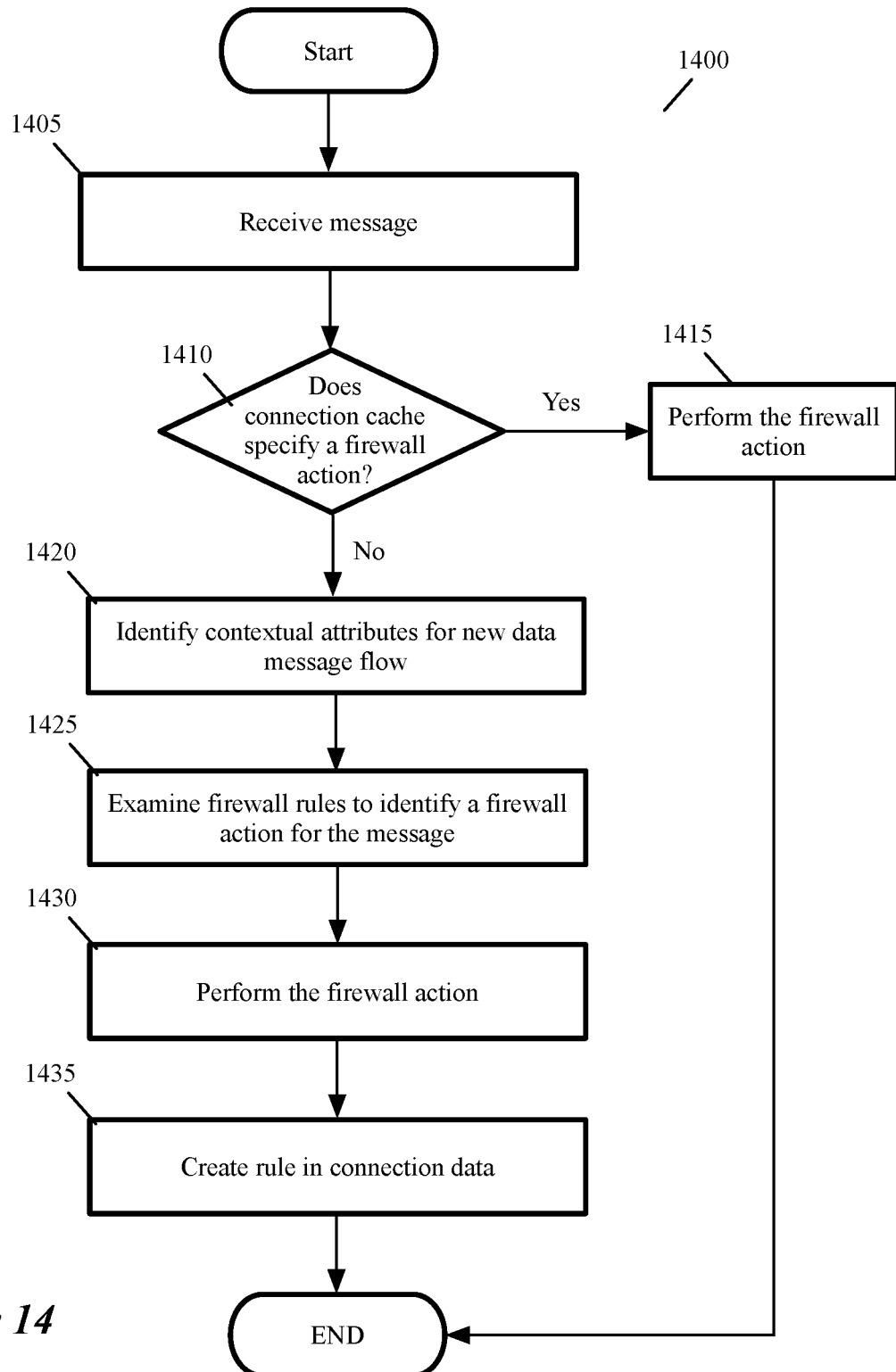
FIG. 14 illustrates a process that a firewall engine performs in some embodiments.

FIG. 14 illustrates a process 1400 that the firewall engine 128 performs in some embodiments. As shown, the process 1400 starts when the firewall engine receives (at 1405) a data message from its corresponding SFE port 260. This port relays this message when it receives the data message from its VM or for its VM. In some embodiments, the port relays the data message by passing to the firewall engine a reference (e.g., a handle that identifies a location in memory that stores the data message) to the data message or the data message's header values.

The process determines (at 1410) whether the connection state cache 225 stores a record that identifies a firewall action for the message flow of the received data message. As mentioned above, each time a firewall engine uses a firewall rule to process a new data message, the firewall engine in some embodiments creates a record in the connection state cache 225 to store the firewall action performed, so that when the firewall engine receives another data message within the same flow (i.e., with the same five-tuple identifier), it can perform the same firewall action that it performed on previous data messages in the same flow. The use of the connection state cache 225 allows the firewall engine 128 to process the data message flows more quickly. In some embodiments, each cached record in the connection state cache 225 has a record identifier that is defined in terms of data message identifiers (e.g., five-tuple identifiers). In these embodiments, the process compares the received data message's identifier (e.g., five-tuple identifier) with the record identifiers of the cached records to identify any record with a record identifier that matches the received data message's identifier.

When the process 1400 identifies (at 1410) a record for the received data message's flow in the connection state cache 225, the process (at 1415) then performs the firewall action (e.g., Allow, Drop, Re-Route, etc.) specified in this record. Assuming that the firewall action does not require the data message to be dropped, the process 1400 sends the processed data message along its datapath. In some embodiments, this operation entails returning a communication to the SFE port 260 (that called the firewall engine to initiate the process 1400) to indicate that the firewall engine is done with its processing of the VM data message. The SFE port 260 can then handoff the data message to the SFE or the VM, or can call another service engine in the I/O chain operator to perform another service operation on the data message.

When the firewall action performed at 1415 results in the dropping of the data message, the process 1400 notifies (at 1415) the SFE port 260 of this operation. Also, when the firewall action performed at 1415 requires the data message to be re-routed, the process 1400 performs (at 1415) a network address translation on the data message in order to effectuate this re-routing, and then returns (at 1415) the data message to the SFE port so that the data message can be sent along its datapath. After 1415, the process 1400 ends.

When the process 1400 determines (at 1410) that the connection state cache 225 does not store a record for the received data message's flow, the process 1400 identifies (at 1420) one or more contextual attributes for this data message flow. As mentioned above, the service engines of different embodiments perform this operation differently. For instance, in some embodiments, the firewall engine 128 checks the attribute-mapping storage 223 for a record that has a record identifier that matches the received data message's header values (e.g., its five-tuple identifier). It then uses (at 1420) the contextual attribute set of this matching record as the contextual attribute set of the received data message flow.

In other embodiments, the firewall engine 128 queries the context engine to obtain the contextual attribute set for the received data message. With this query, the firewall engine supplies the received message's flow identifier (e.g., five-tuple identifier) or its associated service token. The context engine then uses the message's flow identifier or its associated service token to identify a set of contextual attributes in its context attribute storage 145, as explained above.

Once the process 1400 has obtained the contextual attribute set for the received data message, it uses this attribute set along with the message's other identifiers to identify (at 1425) a firewall rule in the firewall rule data store 140 for the data message received at 1405. For instance, in some embodiments, the firewall rules have rule identifiers 705 that are defined in terms of one or more of the five-tuple attributes along with one or more contextual attributes, such as application name, application version, user ID, group ID, AppID, threat level, resource consumption level, etc. To identify the firewall rule in the firewall rule data store 140, the process in some embodiments compares the contextual attributes and/or other attributes (e.g., five-tuple identifier) of the received data message with the rule identifiers (e.g., rule identifiers 705) of the firewall rules to identify the highest priority rule that has an identifier that matches the message's attribute set.

In some embodiments, the process uses different message-attribute sets to perform this comparison operation. For instance, in some embodiments, the message attribute set includes one or more of the other five-tuple identifiers (e.g., one or more of the source IP, source port, destination port, and protocol) along with one or more contextual attributes. In some embodiments, the message attribute set includes logical network identifiers such as virtual network identifier (VNI), virtual distributed router identifier (VDRI), a logical MAC address, a logical IP address, etc.

After the process identifies a firewall rule (at 1425), it performs (at 1430) the firewall action (e.g., Allow, Drop, Re-Route, etc.) of this rule on the received data message. Assuming that the firewall action does not require the data message to be dropped, the process 1400 sends (at 1430) the processed data message along its datapath. In some embodiments, this operation entails returning a communication to the SFE port 260 (that called the firewall engine to initiate the process 1400) to indicate that the firewall engine is done with its processing of the VM data message. The SFE port 260 can then handoff the data message to the SFE or the VM, or can call another service engine in the I/O chain operator to perform another service operation on the data message.

When the firewall action performed at 1430 results in the dropping of the data message, the process 1400 notifies (at 1430) the SFE port 260 of this operation. Also, when the firewall action performed at 1430 requires the data message to be re-routed, the process 1400 performs (at 1430) a network address translation on the data message in order to effectuate this re-routing, and then returns (at 1430) the data message to the SFE port so that the data message can be sent along its datapath.

After performing the firewall action at 1430, the process creates (at 1435) a record in the connection state cache storage 225. This record identifies the firewall action for the received data message's flow. In some embodiments, this record has a record identifier that is defined by reference to the data message flow's identifier (e.g., its five tuple identifier). After 1435, the process ends.

As mentioned above, the management servers in some embodiments interact with the discovery engines 120 executing on the hosts 200 in a data center to obtain and refresh inventory of all processes and services that are running on the VMs on the hosts. In some embodiments, the management servers (also referred to above and below as the management plane) then provides a rule creation interface for allowing administrators to create context-based firewall rules and/or policies for the firewall engines 128 (as well as service rules for the other service engines 130). The rule creation interface allows the administrators to define high-level firewall policies (and other service policies) based on applications inventoried through the data collected by the discovery engines 120, and contextual attributes collected by the context engines 110 and by the management plane's interface with other management server clusters.

Once the high-level firewall policies (and other service policies) are defined in the management plane, the management plane directly supplies some or all of these policies to the management proxies (not shown) on the hosts 200, and/or indirectly supplies some or all of these policies to these proxies through a set of controllers (e.g., network controllers). In some embodiments, the management proxies publish the received policies as rules to the context-based service rule storages 140. In some embodiments, the proxies transform these policies before publishing them to the context-based service rule storages 140. For instance, in some embodiments, the policies are published with AppliedTo tuples that identify the service nodes and/or logical networks to which they are associated. In some of these embodiments, the management proxies on the hosts remove the AppliedTo tuple from each service policy, before pushing the policy as a service rule to the service rule storage 140. Also, as mentioned above, the context engines 110 on the hosts 200 in some embodiments resolve the policies based on collected contextual attributes, in order to generate rules for the service engines.

Figure 15:
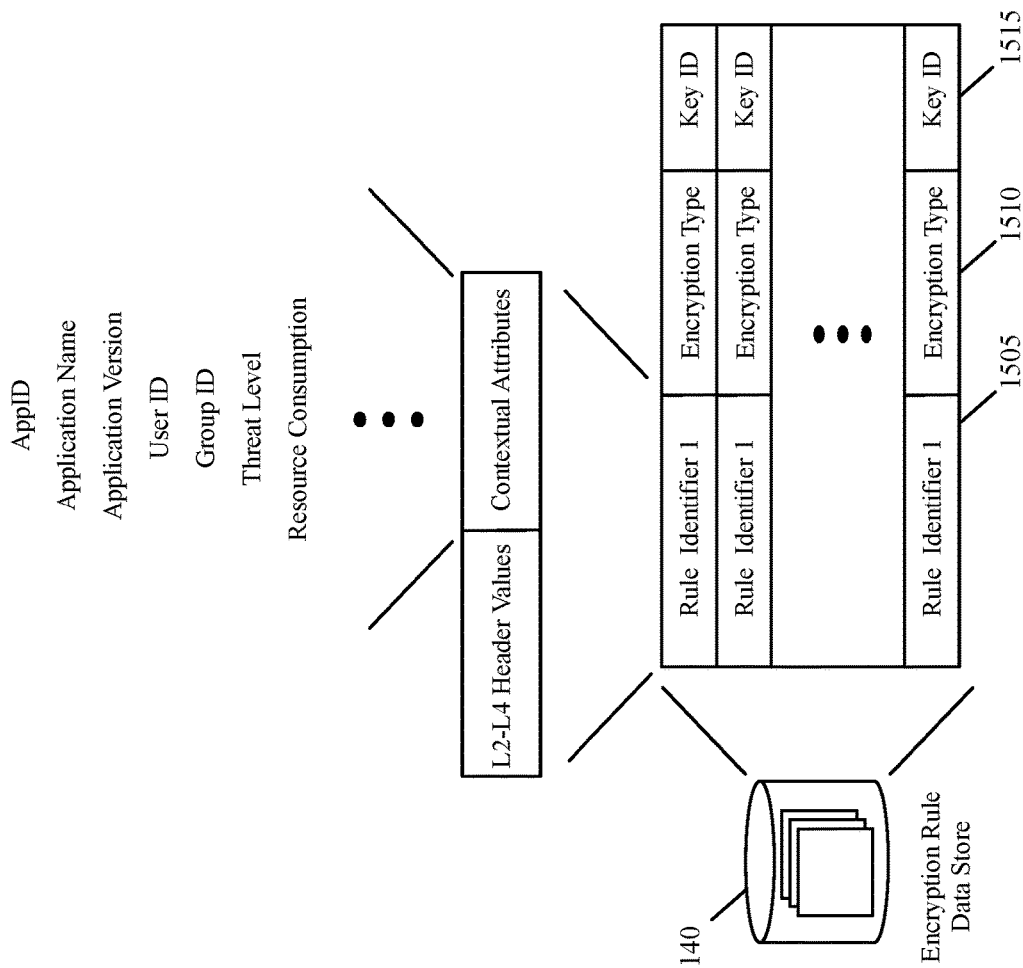
FIG. 15 illustrates an example of such context-based encryption rules.

The encryption engine 124 is a context-based encryptor that performs its encryption/decryption operations based on encryption rules that can be specified in terms of not only L2-L4 parameters, but also in terms of contextual attributes. FIG. 15 illustrates an example of such context-based encryption rules. These rules are used independently by different encryption engines 124 on different hosts 200 to encrypt/decrypt data messages sent by and received for the VMs 205 on these hosts. In this manner, the encryption engines 124 that enforce the same encryption rules on the different hosts (e.g., for one tenant or one logical network) collectively form a distributed encryption engine (i.e., a single, conceptual logical encryption engine) that spans across the multiple hosts to uniformly perform a desired set of encryption and decryption operations. In some embodiments, each VM 205 has its own encryption engine, while in other embodiments, one encryption engine 124 can service multiple VMs 205 on the same host (e.g., multiple VMs for the same tenant on the same host).

FIG. 15 illustrates an encryption rule data store 140 that stores several encryption rules. Each encryption rule includes (1) a rule identifier 1505, (2) an encryption type identifier 1510, and (3) a key identifier 1515. Each rule identifier 1505 specifies one or more data tuples that can be used to identify a rule that matches a data message flow. In some embodiments, a rule identifier can include any L2-L4 parameters (e.g., source IP address, source port, destination port, destination IP, protocol, etc.). These L2-L4 parameters in some embodiments can be defined in the physical domain or logical domain. Also, as shown, the rule identifier can include contextual attributes, such as AppID, application name, application version, user ID, group ID, threat level, and resource consumption.

In some embodiments, an encryptor 124 searches an encryption rule data store 140 by comparing one or more message attributes (e.g., five-tuple header values, contextual attributes) with the rule identifiers 1505 to identify the highest priority rule with a matching rule identifier. Also, in some embodiments, the encryption rule data store 140 has a default rule that is used when no other rule matches a data message flow. In some embodiments, the default rule specifies no encryption key as no rule exists for encrypting the data message flow. Also, in some embodiments, when the default rule is returned to the encryptor 124, the encryptor 124 does not encrypt the data message flow for which it is performing the check.

The encryption type 1510 of each encryption rule specifies the type of encryption/decryption to use, while the key identifier 1515 of each rule identifies the key to use for the encryption/decryption. In some embodiments, the encryption rules only specify the key identifiers 1515 and do not specify the encryption types 1510, because the key identifiers identify both the key and the type of encryption/ decryption or these types are otherwise specified (e.g., preconfigured) in the encryptor.

The encryption and decryption operations of the encryption engine 124 will now be described by reference to FIGS. 16-18. In some embodiments, the encryption and decryption operations use the same key or transposed versions of the same key, because these embodiments use a symmetric encryption scheme in which the same key is used to encrypt and decrypt the message, or transposed versions of the same key are used to encrypt and decrypt the message. Other embodiments use asymmetric encryption schemes (e.g., source encryptor using its private key, and the destination encryptor using the public key of the source encryptor).

Figure 16:
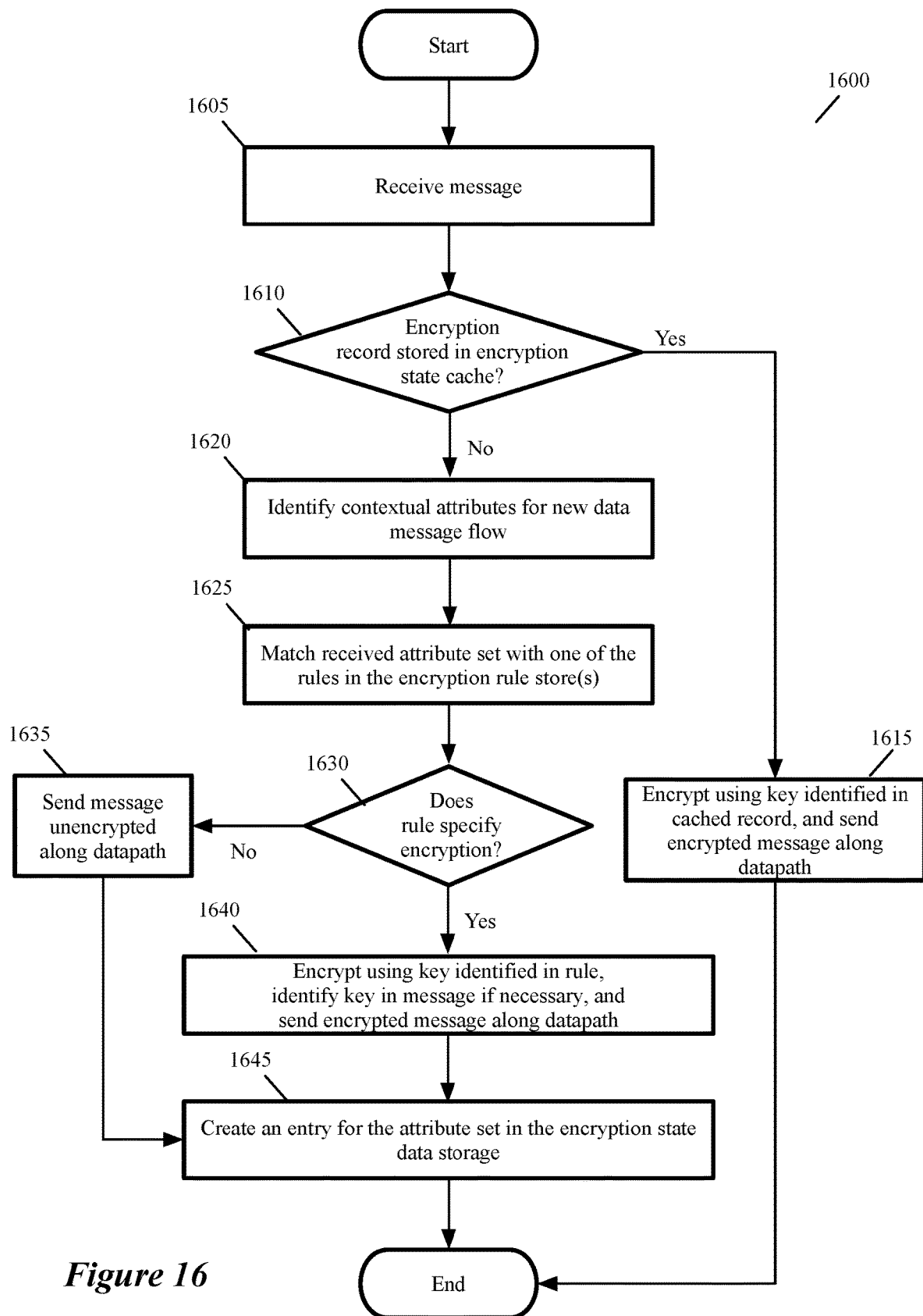
FIG. 16 illustrates a process that the encryptor of some embodiments performs to encrypt a data message sent by a VM on a host.

FIG. 16 illustrates a process 1600 that the encryptor 124 performs to encrypt a data message sent by a VM 205 on the host 200. As shown, the process 1600 starts when the encryptor 124 receives (at 1605) a data message from its corresponding SFE port 260. This port relays this message when it receives the data message from its VM. In some embodiments, the port relays the data message by passing to the encryptor a reference (e.g., a handle that identifies a location in memory that stores the data message) to the data message or the data message's header values.

Next, at 1610, the encryptor determines whether its connection state cache 225 stores a cached encryption record for the received data message. In some embodiments, each time an encryptor finds an encryption rule for a VM data message in some embodiments, it creates a cached encryption record that stores the encryption rule, a reference to the encryption rule, the encryption key, and/or the encryption key's identifier in the connection state cache 225.

The encryptor creates this cache record so that when it receives another data message for the same data message flow, the encryptor does not have to search the encryption rule data store 140 to identify an encryption rule for the subsequently received data messages in the same flow. In some embodiments, each cached record in the connection state cache 225 has a record identifier that is defined in terms of data message identifiers (e.g., five-tuple identifiers). In these embodiments, the process 1600 compares the received data message's identifier (e.g., five-tuple identifier) with the record identifiers of the cached records to identify any record with a record identifier that matches the received data message's identifier.

When the process 1600 identifies (at 1610) a cached encryption record for the received data message in the connection state cache 225, the process (at 1615) then uses the key identified by the identified encryption records to encrypt the received data message. In the embodiments where the cached record contains the encryption rule or a reference to the encryption rule, the process 1600 retrieves a key identifier from the stored or referenced rule and uses this identifier to retrieve a key from a key data store that is stored on the host 200 or from a key manager on the host or operating outside of the host. Similarly, in the embodiments where the cached record contains the key identifier, the process 1600 retrieves a key identifier from the cached record and uses this identifier to retrieve a key from the local or remote key data store or key manager.

In some embodiments, the process encrypts (at 1615) the data message's payload (e.g., the L2 payload) by using the identified encryption key, while generating an integrity check value (ICV) hash of the payload and some or all of the header values (e.g., the physical L3 and L4 header values and/or logical L2 or L3 header values), so that the message's destination would have (1) to decrypt the encrypted portion of the data message, and (2) to verify the authenticity and integrity of the payload and header values that were used for the ICV calculation.

For some or all of the data messages, the encryption process 1600 in some embodiments also encrypts (at 1615) a portion of the data message header. For data messages that are exchanged between machines associated with a logical network, some embodiments encrypt all of the physical header values of the data message. Some of these embodiments perform ICV operation on the logical network identifier (e.g., the VNI) and the payload so that the decryptor at the destination host can verify the authenticity and integrity of the encrypted data message.

After encrypting the data message, the process (at 1615) sends the encrypted data message along its datapath. In some embodiments, this operation entails returning a communication to the SFE port 260 (that called the encryptor to initiate the process 1600) to let the port know that the encryptor is done with its processing of the data message. The SFE port 260 can then handoff the data message to the SFE 210 or can call another I/O chain operator to perform another operation on the data message. After 1615, the process 1600 ends.

When the process 1600 determines (at 1610) that the connection state cache 225 does not store any cached record that matches the received data message, the process 1600 identifies (at 1620) one or more contextual attributes for this data message flow. As mentioned above, the service engines of different embodiments perform this operation differently. For instance, in some embodiments, the encryption engine 124 checks the attribute-mapping storage 223 for a record that has a record identifier that matches the received data message's header values (e.g., its five-tuple identifier). It then uses (at 1620) the contextual attribute set of this matching record as the contextual attribute set of the received data message flow.

In other embodiments, the encryption engine 124 queries the context engine 110 to obtain the contextual attribute set for the received data message. With this query, the encryption engine supplies the received message's flow identifier (e.g., five-tuple identifier) or its associated service token, which the context engine then uses to identify a set of contextual attributes in its context attribute storage 145, as explained above.

Once the process 600 has obtained the contextual attribute set for the received data message, it uses this attribute set by itself or along with the message's other identifiers (e.g., five-tuple identifiers) to identify (at 1625) an encryption rule in the encryption rule data store 140 that matches the received data message's attributes. For instance, in some embodiments, the encryption rules have rule identifiers that are defined in terms of one or more of non-contextual attributes (e.g., five-tuple attributes, logical attributes, etc.) and/or one or more contextual attributes, such as application name, application version, user ID, group ID, AppID, threat level, resource consumption level, etc. To identify the encryption rule in the encryption rule data store 140, the process in some embodiments compares contextual attributes and/or other attributes (e.g., five-tuple identifier) of the received data message with the rule identifiers (e.g., rule identifiers 1505) of the encryption rules to identify the highest priority rule that has an identifier that matches the message's attribute set.

After 1625, the process determines (at 1630) whether it identified an encryption rule that specifies that the received data message should be encrypted. As mentioned above, the encryption rule data store 140 has a default encryption rule that matches all data message, and is returned when no other encryption rule matches a received data message. The default encryption rule in some embodiments specifies that the received data message should not be encrypted (e.g., specifies a default key identifier that corresponds to a no-encryption operation).

When the process 1600 determines (at 1630) that the data message should not be encrypted, the process sends (at 1635) the message unencrypted along the message's datapath. This operation 1630 entails informing its SFE port 260 that it has completed processing the data message. After 1635, the process transitions to 1645, where in the connection state cache storage 225, it creates a record to indicate that no encryption should be performed for the received data message flow. In some embodiments, this record is addressed in the connection state cache 225 based on the five-tuple identifier of this flow. After 1645, the process ends.

When the process determines (at 1630) that the data message should be encrypted, the process then (at 1640) retrieves a key identifier from the identified rule, uses this identifier to retrieve a key from a local or remote key data store or manager, as described above, and encrypts the received data message with the retrieved key. This encryption of the data message (at 1640) is identical to the encryption operation 1615 that was above described. For instance, as described above, the process 1600 encrypts the data message's payload (e.g., the L2 payload) by using the identified encryption key, while performing ICV operation on the payload and some or all of the header values (e.g., the physical L3 and L4 header values, logical L2 or L3 header values, and/or the logical network identifiers, such as VNIs and VDRIs). For some or all of the data messages, the encryption process 1600 in some embodiments also encrypts (at 1640) some or all of the data message's header.

After encrypting the data message, the process sends (at 1635) the encrypted data message along its datapath. Again, in some embodiments, this operation entails returning a communication to the SFE port 260 to let the port know that the encryptor is done with its processing of the data message. The SFE port 260 can then handoff the data message to the SFE 210 or can call another I/O chain operator to perform another operation on the data message.

When the encryption rule that is identified at 1630 is a rule that was dynamically created after dynamically detecting an event, the encryptor has to make sure (at 1640) that the key identifier for the key that is used to encrypt the data message is included in the data message header before it is sent. The process 1600 accomplishes this goal differently in different embodiments. In some embodiments, the process 1600 passes (at 1640) the key identifier to the SFE port 260 (that called it) so that the port or an I/O chain operator that it calls can insert the key identifier in the data message header. For instance, in some embodiments, one service engine (e.g., another I/O chain operator) encapsulates the data message with a tunnel header that is used to establish an overlay logical network. In some of these embodiments, the SFE port 260 passes the key identifier that it receives from the process 1600 to this service engine so that it can include this key identifier in its header.

In other embodiments, the process 1600 does not pass a key identifier to the SFE port and this port does not have another service engine encapsulate a key identifier in the overlay network's tunnel header. In some of these embodiments, the SFE port 260 simply has the service engine include in the overlay network's tunnel header an indication that the data message is encrypted. In these embodiments, a decryptor (e.g., an encryption engine 124) executing on the host with the destination DCN can identify the correct key to use to decrypt the data message based on preconfigured information (e.g., a whitebox solution that allows the decryptor to pick the correct key based on a prior key specified for communicating with the source DCN, or based on header values of the data message flow), or based on out-of-band communication with a controller or a module on the source host regarding the appropriate key to use.

After 1640, the process transitions to 1645, where in the connection state cache storage 225, it creates a record to store the encryption rule identified at 1625, a reference to this encryption rule, the key identifier specified in this encryption rule, and/or the retrieved key specified by this key identifier. As mentioned above, this cached record has a record identifier that in some embodiments includes the received data message's identifier (e.g., five-tuple identifier). After 1645, the process ends.

Figure 17:
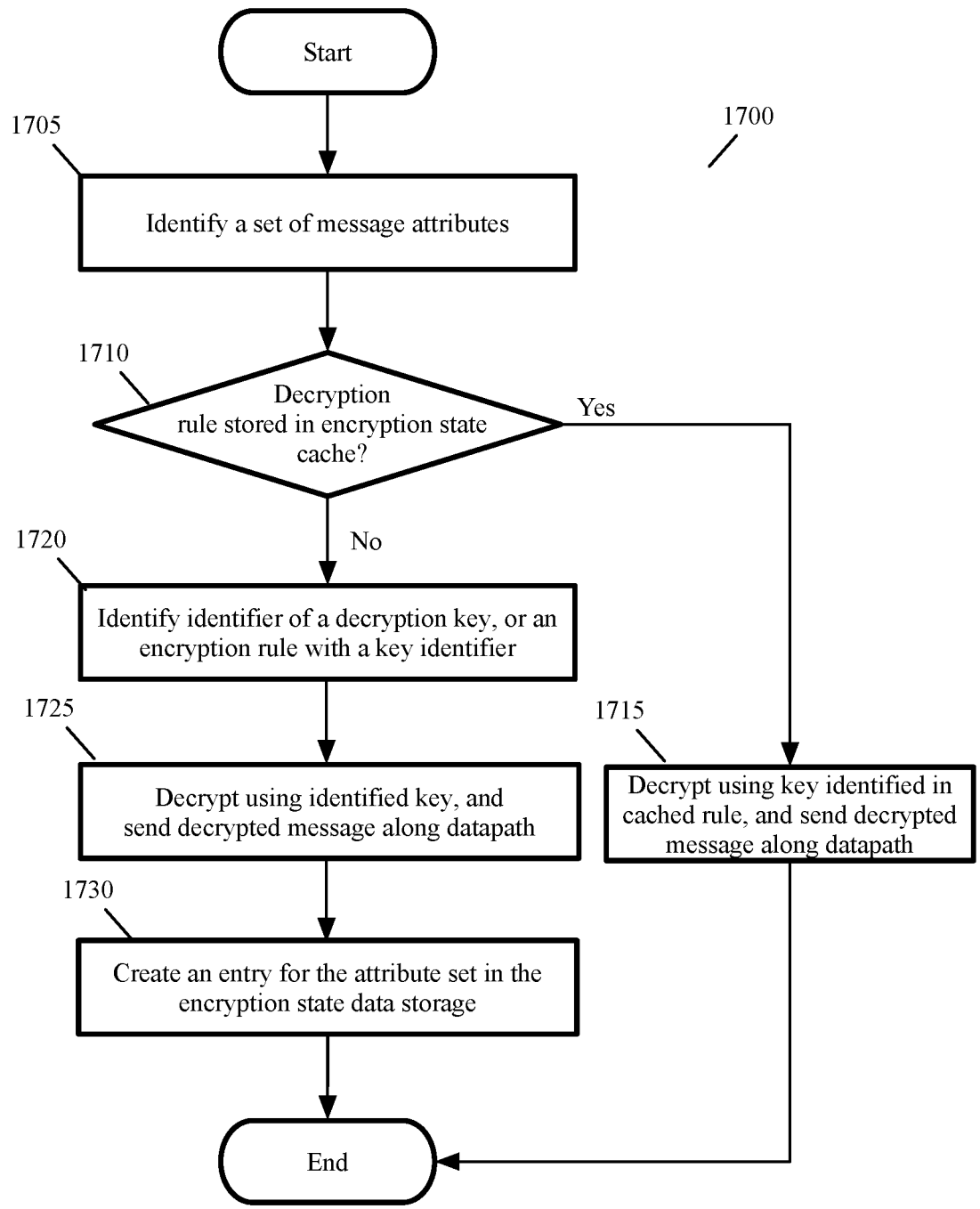
FIG. 17 illustrates a process that an encryption engine performs to decrypt an encrypted data message that a forwarding-element port receives on a destination host that executes a destination VM of the data message.
Figure 18:
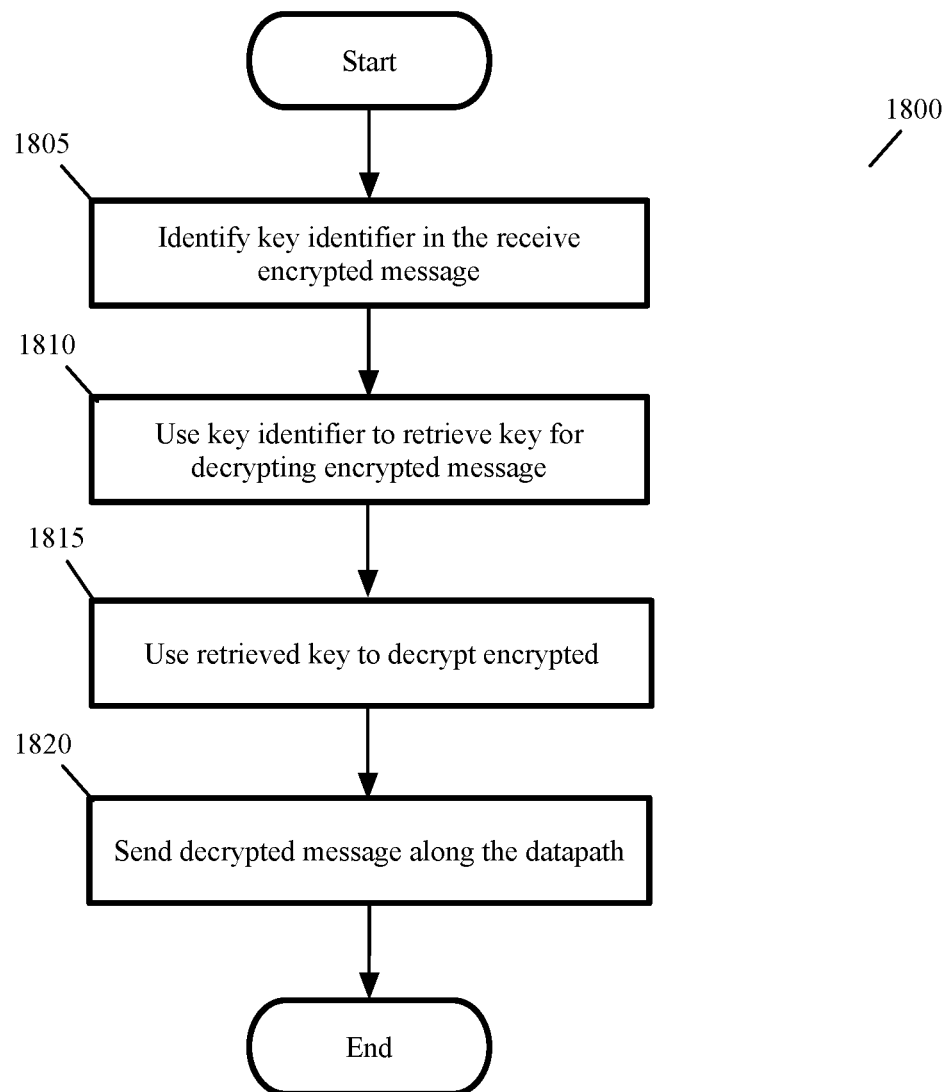
FIG. 18 illustrates a process that the encryption engine performs to decrypt an encrypted data message that includes the key identifier in its header.

FIG. 17 illustrates a process 1700 that an encryption engine 124 performs to decrypt an encrypted data message that an SFE port 260 or 265 receives on a destination host that executes the destination VM of the data message. This encryption engine is referred to as the decryptor below. In some embodiments, the decryptor performs this operation when its corresponding SFE port calls the decryptor to check whether a received data message is encrypted, and if so, to decrypt this message.

In some embodiments, the SFE port calls the encryption engine 124 when the SFE port determines that the received data message is encrypted. For instance, in some embodiments, the data message is sent to the destination host along a tunnel, and the header for this tunnel has an identifier that specifies that the data message is encrypted. In some embodiments, the decryptor performs this process only if the header value of the received data message does not specify a key identifier that identifies a key for decrypting the data message. When the header value does specify such a key identifier, the decryptor uses a decryption process 1800 of FIG. 18, which will be described below.

Also, in some embodiments, the received data message has a value (e.g., a bit) that specifies whether the message is encrypted. By analyzing this value, the decryptor will know whether the message is encrypted. When this value specifies that the message is not encrypted, the decryptor does not call either the process 1700 or 1800 to decrypt the encrypted message. Instead, the decryptor informs the SFE port that it can send the data message along its datapath.

As shown, the process 1700 initially identifies (at 1705) a set of message attributes that the process uses to identify an encryption rule that is applicable to the received data message. In different embodiments, the message-attribute set that is used to retrieve the rule can be different. For example, in some embodiments, this message-attribute set includes the received data message's five-tuple identifier. In some embodiments, this message-attribute set also includes the logical network identifier associated with the received data message.

After 1705, the decryptor determines (at 1710) whether its encryption state cache 225 stores a cached encryption rule for the message attribute set identified at 1705. Like an encryptor, each time a decryptor finds an encryption rule for a data message in some embodiments, it stores the encryption rule, a reference to the encryption rule, this rule's key identifier or this rule's key in the connection state cache 225, so that when it receives another data message with the same identified message-attribute set (e.g., when it received another data message that is part of the same data flow as the original data message), the decryptor does not have to search the encryption rule data store(s) to identify an encryption rule for the subsequently received data message. As mentioned above, the connection state cache 225, in some embodiments, stores the encryption rules based on five-tuple identifiers of the data messages. Accordingly, before searching the encryption rule data store 140, the decryptor in some embodiments first determines whether the connection state cache 225 stores a matching cached record for the received data message.

When the process 1700 identifies (at 1710) matching cached record for the received data message in the connection state cache 225, the process (at 1715) then uses this record to identify a key, which it then uses to decrypts the encrypted portion of the received data message. In some embodiments, the cached record includes the key, while in other embodiments, this record includes the key identifier or the rule or a reference to the rule, which contains the key identifier. In the latter embodiments, the process uses the key identifier in the cached record or in the stored or referenced rule to retrieve a key from a local or remote key data store or manager, and then decrypts the encrypted portion of the received data message with the retrieved key.

In some embodiments, part of the decryption operation (at 1715) is to authenticate the ICV generated hash of the data message header and payload. Specifically, when a portion of the received data message (e.g., its physical (e.g., L3 or L4) header values, or its logical (e.g., VNI) header values) is hashed along with the payload through an ICV operation by the encryptor, the decryption operation verifies this portion to validate the authenticity and integrity of the encrypted data message.

After decrypting the data message (at 1715), the process (at 1715) sends the decrypted data message along its datapath. In some embodiments, this operation entails returning a communication to the SFE port (that called the decryptor to initiate the process 1700) to let the port know that the decryptor is done with its processing of the data message. The SFE port can then allow the data message to reach the destination VM or can call another I/O chain operator to perform another operation on the data message. After 1715, the process 1700 ends.

When the process 1700 determines (at 1710) that the connection state cache 225 does not store an encryption rule for the attribute set identified at 1705, the process 1700 searches (at 1720) the encryption rule data store 140 to identify an encryption rule for the received data message. In some embodiments, the destination host receives an out-of-band communication from the source host (directly or through a controller set) that provides data from which the destination host can identify a key identifier, or an encryption rule with the key identifier, for decrypting the encrypted data message. In some of these embodiments, the out-of-band communication includes the identifier (e.g., five-tuple identifier) for the data message.

In other embodiments, the encryption engine 124 on the destination host identifies the correct key to use to decrypt the data message based on preconfigured information. For example, in some embodiments, the encryption engines 124 on source and destination hosts use a whitebox solution (1) that steps through encryption keys according to a preconfigured scheme, or (2) that selects encryption keys based on attributes (e.g., five-tuple identifiers) of the data messages. By having the source and destination encryption engines follow the same scheme to step through or select the encryption keys, the whitebox scheme ensures that the encryption engine at the destination host's encryptor 124 can select the same encryption key for decrypting the received data message as the source host's encryptor 124 used to encrypt the data message.

When the process 1700 cannot find an encryption rule that identifies a key, the process 1700 in some embodiments initiates an error handling process to resolve the unavailability of a decryption key for decrypting the encrypted message. This error handling process in some embodiments queries a network agent to determine whether it or the controller set stores an encryption rule for the message attribute set identified at 1705. When the agent has such an encryption rule, it provides it to the process (at 1720). However, in other embodiments, the error handling process does not contact the network agent to obtain the key. Instead, it just flags this issue for an administrator to resolve.

When that the process identifies (at 1720) a key identifier or an encryption rule with a key identifier, the process (at 1725) uses the key identifier to retrieve a key from a local or remote key data store or manager, and decrypts the received data message with the retrieved key. In some embodiments, part of the decryption operation (at 1725) is to authenticate an ICV generated hash of the data message header and payload. Specifically, when a portion of the received data message (e.g., its physical (e.g., L3 or L4) header values, or its logical (e.g., VNI) header values) is hashed through an ICV operation along with the payload by the encryptor, the decryption operation verifies this portion to validate the authenticity and integrity of the encrypted data message.

After decrypting the data message, the process (at 1725) sends the decrypted data message along its datapath. In some embodiments, this operation entails returning a communication to the SFE port (that called the decryptor to initiate the process 1700) to let the port know that the decryptor is done with its processing of the data message. The SFE port can then allow the data message to reach the destination VM or can call another I/O chain operator to perform another operation on the data message.

After 1725, the process transitions to 1730, where in the connection state cache storage 225, it creates a record to specify that decryption key, or the identifier to this key, that should be used to decrypt data messages with message-attribute sets that are similar to the set identified at 1705 (e.g., to decrypt data messages that are part of the same flow as the received data message). In some embodiments, this record is addressed in the connection state cache cache 225 based on the five-tuple identifier of the received data message. After 1730, the process ends.

In some embodiments, the header value (e.g., the tunnel header) of the received encrypted data message stores a key identifier that identifies a key for decrypting the data message. The encryption engine 124 on a host device then performs its decryption operation by using the key identified by the key identifier. FIG. 18 illustrates a process 1800 that the encryption engine 124 performs to decrypt an encrypted data message that includes the key identifier in its header. In some embodiments, a decryptor in the encryption engine 124 performs this operation when its corresponding SFE port 260 or 265 calls the decryptor to check whether a received data message is encrypted, and if so, to decrypt this message. In some embodiments, the decryptor performs this process only if the header value of the received data message specifies a key identifier that identifies a key for decrypting the data message.

As shown, the process 1800 initially extracts (at 1805) the key identifier from the received data message. Next, the process uses (at 1810) the key identifier to retrieve a key from a local key data store/manager on the destination host or a remote key data store/manager not on the destination host, and then uses (at 1815) this key to decrypt the received data message. As mentioned above, part of the decryption operation (at 1815) is to authenticate the ICV generated hash (of the received data message's header and payload) that is encrypted with the payload of the data message. In some embodiments, the process 1800 stores in the cache data store 225 the key so that it does not need to identify this key for other data messages in the same data message flow as the received data message.

After decrypting the data message, the process sends (at 1820) the decrypted data message along its datapath. In some embodiments, this operation entails returning a communication to the SFE port (that called the decryptor to initiate the process 1800) to let the port know that the decryptor is done with its processing of the data message. The SFE port can then allow the data message to reach the destination VM or can call another I/O chain operator to perform another operation on the data message. After 1820, the process 1800 ends.

Because of its use of contextual attributes to define the rule identifiers of the Encryption rules, the context-based encryptor 124 can distribute the data message flows based on any number of contextual attributes. As mentioned above, examples of such encryption operations include: (1) encrypt all traffic from Outlook (started on any machine) to Exchange Server, (2) encrypt all communication between applications in a three tier Webserver, Application Server and Database Server, (3) encrypt all traffic originating from the Administrators Active Directory group, etc.

As mentioned above, the management servers in some embodiments interact with the discovery engines 120 executing on the hosts 200 in a data center to obtain and refresh inventory of all processes and services that are running on the VMs on the hosts. The management plane in some embodiments then provides a rule creation interface for allowing administrators to create context-based encryption rules and/or policies for the encryption engines 124 (as well as service rules for the other service engines 130). The rule creation interface allows the administrators to define high-level encryption policies (and other service policies) based on applications inventoried through the data collected by the discovery engines 120, and contextual attributes collected by the context engines 110 and by the management plane's interface with other management server clusters.

Once the high-level encryption policies (and other service policies) are defined in the management plane, the management plane directly supplies some or all of these policies to the management proxies (not shown) on the hosts 200, and/or indirectly supplies some or all of these policies to these proxies through a set of controllers (e.g., network controllers). In some embodiments, the management proxies publish the received policies as rules to the context-based service rule storages 140. In some embodiments, the proxies transform these policies before publishing them to the context-based service rule storages 140. For instance, in some embodiments, the policies are published with AppliedTo tuples that identify the service nodes and/or logical networks to which they are associated. In some of these embodiments, the management proxies on the hosts remove the AppliedTo tuple from each service policy, before pushing the policy as a service rule to the service rule storage 140. Also, as mentioned above, the context engines 110 on the hosts 200 in some embodiments resolve the policies based on collected contextual attributes, in order to generate rules for the service engines.

Figure 19:
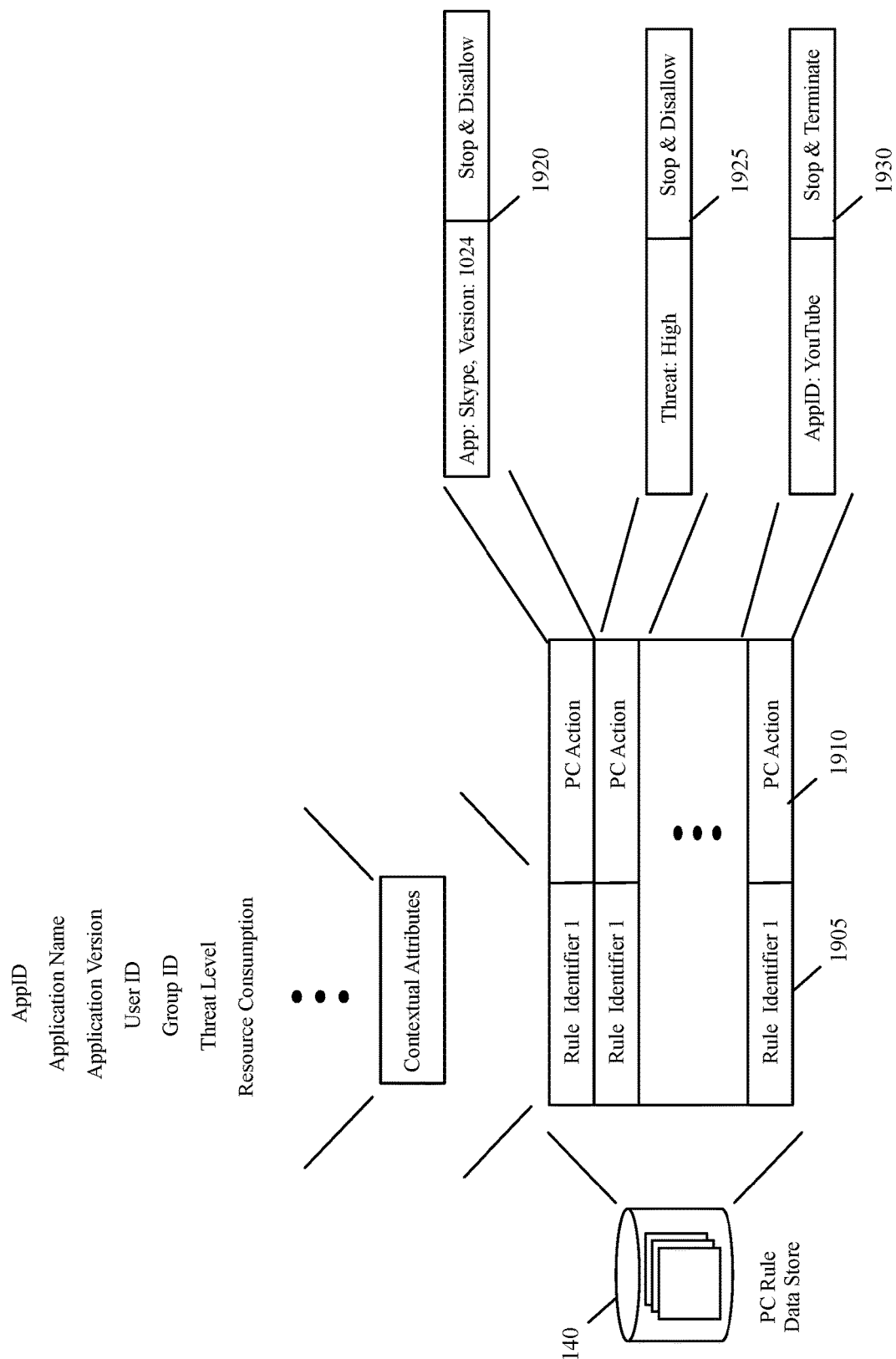
FIG. 19 illustrates several examples of process control rules.

The process control (PC) engine 122 is a context-based PC engine that performs its PC operations based on PC rules that can be specified in terms of contextual attributes. FIG. 19 illustrates several examples of such PC rules. This figure illustrates a PC rule data store 140 of some embodiments. As shown, each PC rule includes a rule identifier 1905 and a PC action 1910. In some embodiments, a PC action 1910 can be (1) Allow, (2) Stop and Disallow, or (3) Stop and Terminate.

Each rule identifier 1905 specifies one or more data tuples that can be used to identify a rule that matches a data message flow. As shown, a rule identifier can include contextual attributes, such as AppID, application name, application version, user ID, group ID, threat level, resource consumption, etc. In some embodiments, a PC engine searches a PC data storage by comparing one or more message attributes (e.g., contextual attributes) with the rule identifiers 1905 to identify the highest priority rule with a matching rule identifier. In some embodiments, the rule identifier 1905 can also include L2-L4 parameters (e.g., five tuple identifiers) associated with data message flows, and the PC engine performs its PC operations on a per flow basis. In other embodiments, the PC engine 122 only performs its PC operations for process events, and leaves it to the firewall engine 128 to perform PC operations on a per flow basis. Accordingly, in some embodiments, the rule identifiers 1905 of the PC rules for the PC engine do not include any L2-L4 parameters.

In some embodiments, different PC engines 122 on different hosts enforce the same set of PC rules. For instance, in some embodiments, different PC engines 122 process the same PC rules on different hosts for VMs of one logical network in order to provide a level of security on the processes running on these VMs. For this logical network, these PC engines 122 collectively form a distributed PC engine (i.e., a single, conceptual logical PC engine) that spans across the multiple hosts.

FIG. 19 illustrates three detailed examples of the context-based PC rules of some embodiments. The first rule 1920 specifies that Skype Version 1024 should be Stopped and Disallowed. In some embodiments, each time the PC engine 122 identifies a new process event, it identifies the event's contextual attributes by interacting with the context engine or by examining the records in its attribute-mapping storage 223 to identify a record that specifies the contextual attributes for the process identifier.

The second rule 1925 specifies that all processes that have a High threat level should be Stopped and Disallowed. As mentioned above, the context engine 110 or service engines 130 can interact with threat detector 132 to assess the threat level associated with a process. In some embodiments, the threat detector generates a threat score, which the context engine, PC engine, or the other service engines quantize into one of several categories. For example, in some embodiments, the threat detector produces a threat score from 0 to 100, and one of the engines 110 or 130, designates scores between 0 and 33 to be a low threat level, designates scores between 34 and 66 to be a medium threat level, and designates scores between 67 and 100 to be a high threat level.

The third rule 1930 specifies that all processes that generate YouTube traffic should be Stopped and Terminated. In some embodiments, this rule is enforced by the PC engine, while in other embodiments, a similar rule is enforced by the firewall engine. When the firewall engine enforces such a rule, it enforces this rule on a per flow basis and its action is to drop packets associated with this flow. The PC engine can enforce this rule when checking a process event, or when it is called by the SFE port 260 to perform a PC check on a particular flow.

Figure 20:
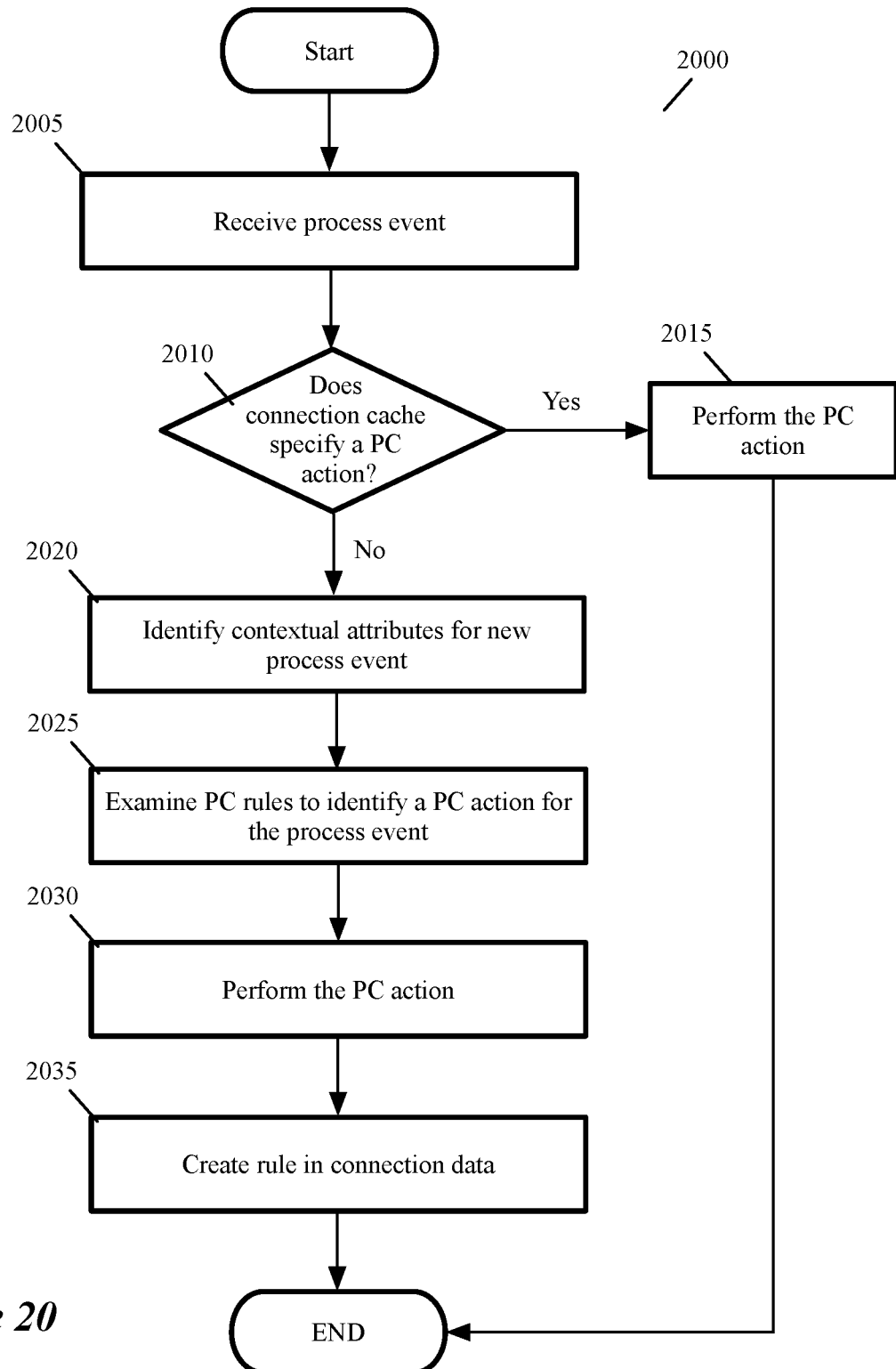
FIG. 20 illustrates a process that the process control engine performs in some embodiments.

FIG. 20 illustrates a process 2000 that the PC engine 122 performs in some embodiments. As shown, the process 2000 starts when the PC engine receives (at 2005) a process identifier from the context engine 110. The context engine relays this process ID when it receives a process notification from the GI agent 250 on a VM 205.

The process 2000 determines (at 2010) whether the connection state cache 225 stores a record that identifies a PC action for the received process ID. Each time a PC engine uses a PC rule to process a new process identifier, the PC engine in some embodiments creates a record in the connection state cache 225 to store the PC action performed so that it can subsequently rely on this cache for faster processing of the same process identifier. In some embodiments, each cached record in the connection state cache 225 has a record identifier that is defined in terms of process identifier. In these embodiments, the process compares the received identifier with the record identifiers of the cached records to identify any record with a record identifier that matches the received process identifier.

When the process 2000 identifies (at 2010) a record for the received process event in the connection state cache 225, the process (at 2015) then performs the PC action specified in this record. When this operation is a disallowance or a termination, the PC engine directs the context engine 110 to disallow or terminate the process. To do this, the context engine 110 directs the GI agent that reported the event to disallow or terminate the process. The GI agent then directs the process subsystem of the OS to disallow or terminate the process. After 2015, the process 2000 ends.

When the process 2000 determines (at 2010) that the connection state cache 225 does not store a record for the received process identifier, the process 2000 identifies (at 2020) one or more contextual attributes for this process identifier. As mentioned above, the service engines of different embodiments perform this operation differently. In some embodiments, the PC engine directs the context engine to collect additional process attributes for the received process event and the context engine collects this information by interacting with the GI agent.

Once the process 2000 has obtained the contextual attribute set for the received data message, it uses this attribute set to identify (at 2025) a PC rule in the PC rule data store 140. In some embodiments, the PC rules have rule identifiers 1505 that are defined in terms of one or more contextual attributes, such as application name, application version, user ID, group ID, AppID, threat level, resource consumption level, etc. To identify the PC rule in the data store 140, the process in some embodiments compares the collected contextual attributes with the rule identifiers (e.g., rule identifiers 1905) of the PC rules to identify the highest priority rule that has an identifier that matches the collected attribute set.

When the process identifies a PC rule (at 2025), it performs the PC action (e.g., Allow, Stop and Disallow, Stop and Terminate, etc.) of this rule on the received process event. When this operation is a disallowance or a termination, the PC engine directs the context engine 110 to disallow or terminate the process. To do this, the context engine 110 directs the GI agent that reported the event to disallow or terminate the process. The GI agent then directs the process subsystem of the OS to disallow or terminate the process. After performing the PC action at 2030, the process creates (at 2035) a record in the connection state cache storage 225. This record identifies the PC action for the received process event. After 2035, the process ends.

As mentioned above, the management servers in some embodiments interact with the discovery engines 120 executing on the hosts 200 in a data center to obtain and refresh inventory of all processes and services that are running on the VMs on the hosts. The management plane in some embodiments then provides a rule creation interface for allowing administrators to create context-based PC rules and/or policies for the PC engines 122 (as well as service rules for the other service engines 130). The rule creation interface allows the administrators to define high-level PC policies (and other service policies) based on applications inventoried through the data collected by the discovery engines 120, and contextual attributes collected by the context engines 110 and by the management plane's interface with other management server clusters.

Once the high-level PC policies (and other service policies) are defined in the management plane, the management plane directly supplies some or all of these policies to the management proxies (not shown) on the hosts 200, and/or indirectly supplies some or all of these policies to these proxies through a set of controllers (e.g., network controllers). In some embodiments, the management proxies publish the received policies as rules to the context-based service rule storages 140. In some embodiments, the proxies transform these policies before publishing them to the context-based service rule storages 140. Also, as mentioned above, the context engines 110 on the hosts 200 in some embodiments resolve the policies based on collected contextual attributes, in order to generate rules for the service engines.

Figure 21:
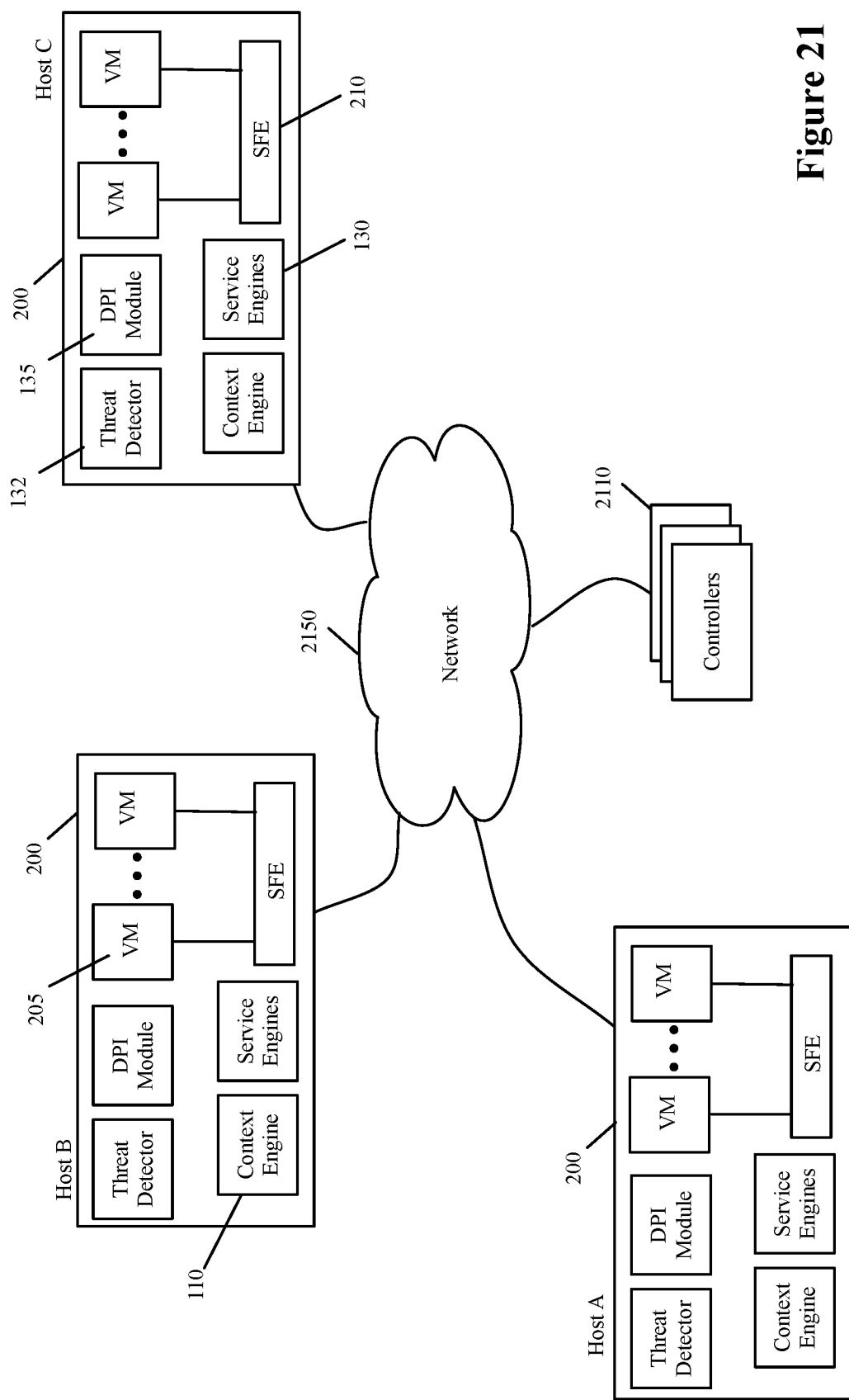
FIG. 21 illustrates an example of how the service engines are managed in some embodiments.

FIG. 21 illustrates an example of how the service engines 130 are managed in some embodiments. This figure illustrates multiple hosts 200 in a datacenter. As shown, each host includes several service engines 130, a context engine 110, a threat detector 132, a DPI module 135, several VMs 205, and an SFE 210. It also illustrates a set of controllers 2110 for managing the service engines 130, VMs 205, and SFEs 210. As mentioned above, the context engines 110 in some embodiments collect contextual attributes that are passed to the management servers in the controller set through a network 2150 (e.g., through a local area network, a wide area network, a network of networks (such as the Internet), etc.). The controller set provides a user interface for the administrators to define context-based service rules in terms of these collected contextual attributes, and communicates with the hosts through the network 2150 to provide these policies. The hosts also communicatively connect to each other through this network 2150.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
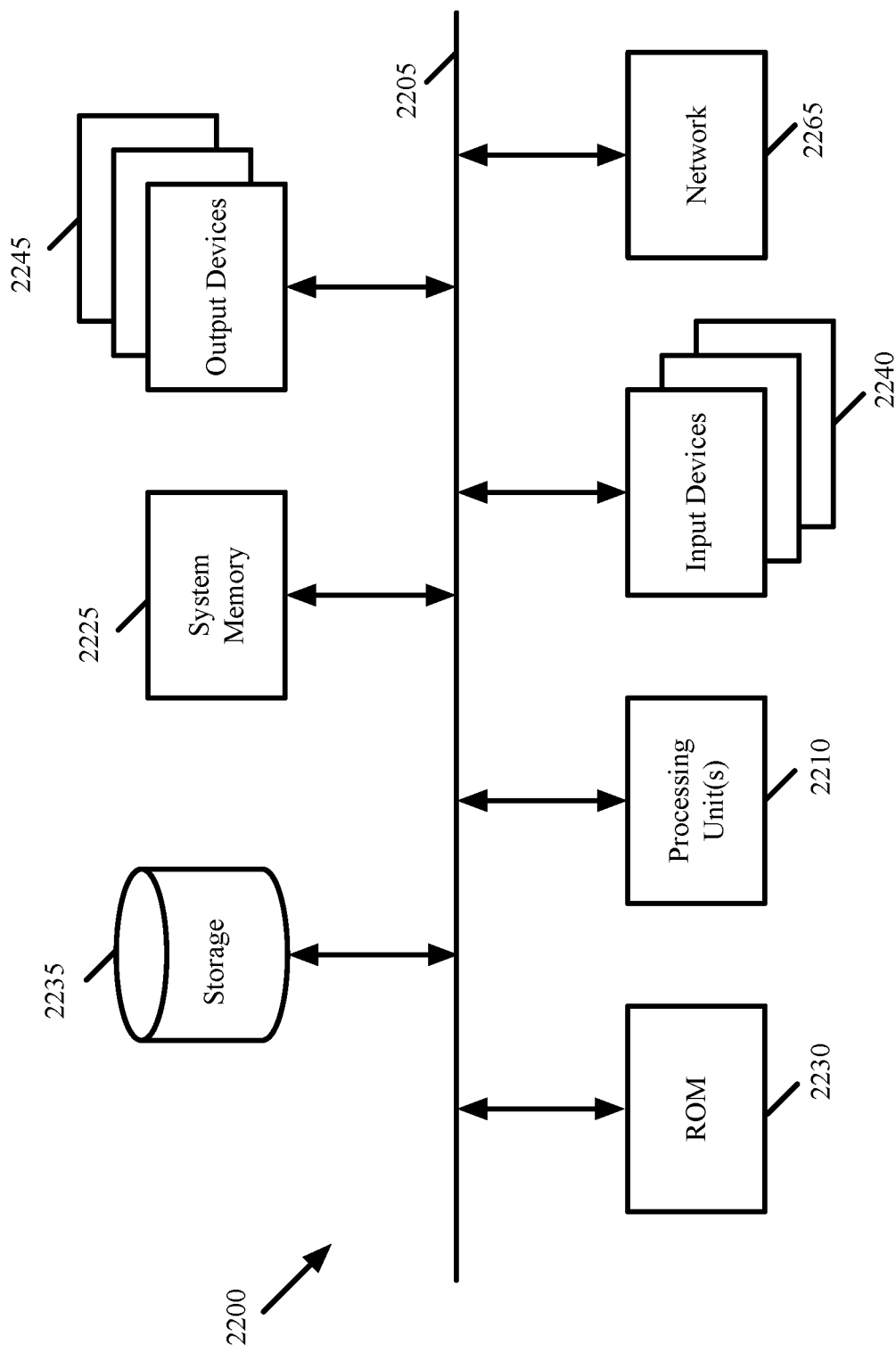
FIG. 22 conceptually illustrates a computer system with which some embodiments of the invention are implemented.

FIG. 22 conceptually illustrates a computer system 2200 with which some embodiments of the invention are implemented. The computer system 2200 can be used to implement any of the above-described hosts, controllers, and managers. As such, it can be used to execute any of the above described processes. This computer system includes various types of non-transitory machine readable media and interfaces for various other types of machine readable media. Computer system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the computer system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments. The read-only-memory (ROM) 2230 stores static data and instructions that are needed by the processing unit(s) 2210 and other modules of the computer system. The permanent storage device 2235, on the other hand, is a read-and-write memory device. This device is a non-volatile memory unit that stores instructions and data even when the computer system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the computer system. The input devices 2240 include alphanumeric keyboards and pointing devices (also called "cursor control devices"). The output devices 2245 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples computer system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of computer system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims

I claim:

1. A method of capturing process-based events on a host computer executing a plurality of machines including a particular machine, the method comprising:
    at a context-collecting engine executing on the host computer separately from the particular machine:
        receiving, from a guest introspection (GI) agent installed on the particular machine, an identifier for a network event from the particular machine, said network event identifier (i) including a set of one or more contextual attributes and (ii) associated with a new data message flow from the particular machine, the set of contextual attributes comprising a process identifier that identifies a process that is associated with the new data message flow;
        using the process identifier to send a process query to the GI agent installed on the particular machine to obtain an additional set of contextual attributes;
        in response to the process query, receiving the additional set of contextual attributes associated with the process identified by the process identifier; and
        storing, in a storage on the host computer, the received sets of contextual attributes for the network event for a service engine, executing on the host computer separately from the particular machine, subsequently (i) to query the context-collecting engine to obtain the received sets of contextual attributes, (ii) to use the obtained sets of contextual attributes to identify a context-based service rule applicable to the new data message flow and (iii) to perform a context-based service on the new data message flow based on the identified context-based service rule.

2. The method of claim 1, wherein the particular machine is a virtual machine (VM) and the GI agent is installed on the VM.

3. The method of claim 1, wherein the particular machine is a container and the GI agent is a module executing within a memory space of the container.

4. The method of claim 1 further comprising:
    performing a filtering operation to remove at least one contextual attribute from the received sets of contextual attributes that is not relevant for context-based service rules enforced on the host computer;
    wherein storing the received sets of contextual attributes comprises storing the filtered sets of contextual attributes that do not include the removed contextual attribute.

5. The method of claim 4, wherein performing the filtering operation comprises (i) comparing the contextual attributes in the received sets of attributes to attributes used for service rules enforced on the host computer to identify any contextual attribute in the received sets that is not used in any service rule, and (ii) discarding any identified contextual attribute that is not used in any service rule.

6. The method of claim 1, wherein the received sets of contextual attributes comprise:
    at least one of (i) a name of a particular process executing on the particular machine and associated with the particular data message flow, (ii) a hash of the particular process, (iii) a path with command line parameters for the particular process, and (iv) a module loaded by particular process; and
    at least one of (i) a product name associated with the particular process, (ii) a product version associated with the particular process, and (iii) at least a consumption parameter associated with a resource consumed by the particular process.

7. The method of claim 6, wherein the consumed resource is at least one of central processing unit consumption, network consumption, and memory consumption.

8. The method of claim 1, wherein the sets of contextual attributes are stored along with a flow identifier that identifies the data message flow to allow the service engine to subsequently retrieve the sets of contextual attributes for the data message flow by providing a flow identifier for the new data message flow, the flow identifier used by the context engine to match the flow identifier stored with the sets of context attributes stored previously for the new data message flow.

9. The method of claim 8, wherein the flow identifier comprises source IP (Internet Protocol) address, destination IP address, source port, destination port, and protocol.

10. A non-transitory machine readable medium storing sets of instructions for capturing process-based events on a host computer on which a plurality of machines execute, the sets of instructions executing on the host computer separately from a particular machine of the plurality of machines and comprising:
    receiving, from a guest introspection (GI) agent installed on the particular machine, an identifier for a network event from the particular machine, said network event identifier (i) including a set of one or more contextual attributes and (ii) associated with a new data message flow from the particular machine, the set of contextual attributes comprising a process identifier that identifies a process that is associated with the new data message flow;
    using the process identifier to send a process query to the GI agent installed on the particular machine to obtain an additional set of contextual attributes;
    in response to the process query, receiving the additional set of contextual attributes associated with the process identified by the process identifier;
    performing a filtering operation to produce a filtered set of contextual attributes by removing at least one contextual attribute from the received sets of contextual attributes that is not relevant for context-based service rules of a service engine executing on the host computer separately from the particular machine;
    storing, in a storage on the host computer, the filtered set of contextual attributes for the network event;
    receiving, from the service engine, a query for contextual attributes relating to the new data message flow; and
    providing the filtered set of contextual attributes to the service engine (i) to use to identify a context-based service rule applicable to the new data message flow and (ii) to perform a context-based service on the new data message flow based on the identified context-based service rule.

11. The non-transitory machine readable medium of claim 10, wherein the particular machine is a virtual machine (VM) and the GI agent is installed on the VM.

12. The non-transitory machine readable medium of claim 10, wherein the particular machine is a container and the GI agent is a module executing within a memory space of the container.

13. The non-transitory machine readable medium of claim 10, wherein the set of instructions for performing the filtering operation comprises sets of instructions for:
    comparing the contextual attributes in the received sets of contextual attributes to attributes used for the service rules, to identify any contextual attribute in the received sets that is not used in any service rule; and discarding any identified contextual attribute that is not used in any service rule.

14. The non-transitory machine readable medium of claim 10, wherein the received sets of contextual attributes comprise:

at least one of (i) a name of a particular process executing on the particular machine and associated with the particular data message flow, (ii) a hash of the particular process, (iii) a path with command line parameters for the particular process, and (iv) a module loaded by particular process; and at least one of (i) a product name associated with the particular process, (ii) a product version associated with the particular process, and (iii) at least a consumption parameter associated with a resource consumed by the particular process.

15. The non-transitory machine readable medium of claim 14, wherein the consumed resource is at least one of central processing unit consumption, network consumption, and memory consumption.

16. The non-transitory machine readable medium of claim 10, wherein the filtered set of contextual attributes is stored along with a flow identifier that identifies the data message flow to allow the service engine to subsequently retrieve the filtered set of contextual attributes for the data message flow by providing a flow identifier for the new data message flow, the flow identifier used by the context engine to match the flow identifier stored with the sets of context attributes stored previously for the new data message flow.

17. The non-transitory machine readable medium of claim 16, wherein the flow identifier comprises source IP (Internet Protocol) address, destination IP address, source port, destination port, and protocol.

18. The non-transitory machine readable medium of claim 16, wherein the identifier comprises a service tag.

* * * * *